(12) United States Patent
Niinomi et al.

(10) Patent No.: US 12,542,468 B2
(45) Date of Patent: Feb. 3, 2026

(54) POWER TOOL

(71) Applicant: MAKITA CORPORATION, Anjo (JP)

(72) Inventors: Katsuyuki Niinomi, Anjo (JP); Takaya Yamada, Anjo (JP); Kengo Umemura, Anjo (JP)

(73) Assignee: MAKITA CORPORATION, Anjo (JP)

( * ) Notice: Subject to any disclaimer, the term of this patent is extended or adjusted under 35 U.S.C. 154(b) by 232 days.

(21) Appl. No.: 18/582,797

(22) Filed: Feb. 21, 2024

(65) Prior Publication Data

US 2024/0372430 A1 Nov. 7, 2024

(30) Foreign Application Priority Data

May 1, 2023 (JP) ................................. 2023-075437

(51) Int. Cl.
*H02K 5/20* (2006.01)
*H02K 1/18* (2006.01)
*H02K 5/14* (2006.01)
*H02K 7/08* (2006.01)
*H02K 7/14* (2006.01)
*H02K 9/06* (2006.01)
*H02K 9/28* (2006.01)
*B24B 23/02* (2006.01)
*B24B 47/12* (2006.01)
*B25F 5/00* (2006.01)

(52) U.S. Cl.
CPC ............. *H02K 5/207* (2021.01); *H02K 1/185* (2013.01); *H02K 5/148* (2013.01); *H02K 7/083* (2013.01); *H02K 7/145* (2013.01); *H02K 9/06* (2013.01); *H02K 9/28* (2013.01); *B24B 23/028* (2013.01); *B24B 47/12* (2013.01); *B25F 5/008* (2013.01); *H02K 2205/09* (2013.01)

(58) Field of Classification Search
CPC ........ H02K 5/207; H02K 1/185; H02K 5/148; H02K 7/083; H02K 7/145; H02K 2205/09; H02K 9/06
USPC .................................. 310/50, 128, 135, 233
See application file for complete search history.

(56) References Cited

U.S. PATENT DOCUMENTS

2020/0266679 A1* 8/2020 Fujii ..................... H01R 39/381
2022/0234161 A1 7/2022 Ninagawa et al.

FOREIGN PATENT DOCUMENTS

CN 113146434 A * 7/2021 ............. H02K 13/10
JP 2011083848 A * 4/2011
(Continued)

*Primary Examiner* — Jose A Gonzalez Quinones
(74) *Attorney, Agent, or Firm* — Oliff PLC

(57) ABSTRACT

A power tool includes a motor and a housing. The motor includes a rotor rotatable in one direction about a motor rotation axis and including a rotor shaft to which a fan and a commutator are fixed, a stator surrounding the rotor, and a carbon brush in contact with the commutator. The housing supports the stator and includes a cylinder, a bottom connected to the cylinder, a vent in the bottom, and a rib protruding from the bottom. P1<P2, where P1 is an opening ratio of the vent in a first section from a 0° to 90° position in a counter-rotation direction of the rotor, and P2 is an opening ratio of the vent in a second section from a 0° to 90° position in a forward-rotation direction of the rotor. The rib has an end in a first direction located in the first direction from the carbon brush.

20 Claims, 27 Drawing Sheets

(56) References Cited

FOREIGN PATENT DOCUMENTS

JP            2013129025 A * 7/2013
JP            2022-112974 A    8/2022

\* cited by examiner

POWER TOOL

CROSS-REFERENCE TO RELATED APPLICATIONS

This application claims the benefit of priority to Japanese Patent Application No. 2023-075437, filed on May 1, 2023, the entire contents of which are hereby incorporated by reference.

BACKGROUND

1. Technical Field

The present disclosure relates to a power tool.

2. Description of the Background

A known grinder in the technical field of power tools is described in Japanese Unexamined Patent Application Publication No. 2022-112974.

BRIEF SUMMARY

A grinder is used to polish a workpiece. The grinder polishing a workpiece generates a large amount of dust. Such dust may be transferred in the cooling air between the commutator in the motor and the carbon brushes. Dust entering between the commutator and the carbon brushes may shorten the service lives of the commutator and the carbon brushes.

One or more aspects of the present disclosure are directed to a power tool including a commutator and a carbon brush that are less likely to have a shorter service life.

A first aspect of the present disclosure provides a power tool, including:
  a motor including
    a rotor including a rotor shaft, the rotor being rotatable in one direction about a motor rotation axis extending along a predetermined axis,
    a fan fixed to a first portion of the rotor shaft in a first direction from a middle of the rotor shaft along the predetermined axis,
    a commutator fixed to a second portion of the rotor shaft in a second direction from the middle of the rotor shaft along the predetermined axis,
    a stator surrounding the rotor, and
    a carbon brush in contact with the commutator; and
  a housing supporting the stator, the housing including
    a cylinder surrounding the motor,
    a bottom located in the second direction from the commutator and connected to the cylinder,
    a vent in the bottom, and
    a rib protruding from the bottom in the first direction, the rib having an end in the first direction located in the first direction from the carbon brush,
  wherein a predetermined plane perpendicular to the motor rotation axis includes
    a first reference circle having a diameter being one times an outer diameter of the commutator and centered on the motor rotation axis,
    a second reference circle having a diameter being 1.5 times the outer diameter of the commutator and centered on the motor rotation axis, and
    an annular range between the first reference circle and the second reference circle, and $P1 < P2$, where, when a position at which the second reference circle intersects with a reference line passing through the motor rotation axis and a center of and the carbon brush in the predetermined plane is a 0° position, P1 is an opening ratio of the vent in a first section of the annular range from the 0° position to a 90° position in a counter-rotation direction of the rotor, and P2 is an opening ratio of the vent in a second section of the annular range from the 0° position to a 90° position in a forward-rotation direction of the rotor.

A second aspect of the present disclosure provides a power tool, including:
  a motor including
    a rotor including a rotor shaft, the rotor being rotatable about a motor rotation axis extending along a predetermined axis,
    a fan fixed to a first portion of the rotor shaft in a first direction from a middle of the rotor shaft along the predetermined axis,
    a commutator fixed to a second portion of the rotor shaft in a second direction from the middle of the rotor shaft along the predetermined axis,
    a carbon brush in contact with the commutator, and
    a stator surrounding the rotor, the stator including
      a stator core,
      an insulator fixed to the stator core,
      a rib protruding from the insulator in the second direction, the rib having an end in the second direction located in the second direction from an end of the carbon brush in the first direction, and
      a coil supported by the insulator; and
  a housing supporting the stator, the housing including
    a cylinder surrounding the motor,
    a bottom located in the second direction from the commutator and connected to the cylinder, and
    a vent in the bottom.

A third aspect of the present disclosure provides a power tool, including:
  a motor including
    a rotor including a rotor shaft, the rotor being rotatable about a motor rotation axis extending along a predetermined axis,
    a fan fixed to a first portion of the rotor shaft in a first direction from a middle of the rotor shaft along the predetermined axis,
    a commutator fixed to a second portion of the rotor shaft in a second direction from the middle of the rotor shaft along the predetermined axis,
    a stator surrounding the rotor, the stator including
      a stator core,
      an insulator fixed to the stator core, and
      a coil supported by the insulator, and
    a carbon brush in contact with the commutator;
  a housing supporting the stator, the housing including
    a cylinder surrounding the motor,
    a bottom located in the second direction from the commutator and connected to the cylinder, and
    a vent in the bottom;
  a brush holder supported by the cylinder and holding the carbon brush; and
  an inner baffle between the insulator and the brush holder along the predetermined axis, the inner baffle having an inner end located inward from an inner end of the insulator in a radial direction of the motor rotating axis,
  wherein a predetermined plane perpendicular to the motor rotation axis includes a first reference circle having a diameter being one times an outer diameter of the commutator and centered on the motor rotation axis, a second reference circle having a diameter being 1.5 times the outer diameter of the commutator and centered on the motor rotation axis, and an annular range between the first reference circle and the second reference circle, and S1>S2, where, when a position at which the second reference circle intersects with a reference line passing through the motor rotation axis and a center of the carbon brush in the predetermined plane is a 0° position, S1 is an area of the inner baffle in a first section of the annular range from the 0° position to a 90° position in a counter-rotation direction of the rotor, and S2 is an area of the inner baffle in a second section of the annular range from the 0° position to a 90° position in a forward-rotation direction of the rotor.

The power tool according to the above aspects of the present disclosure includes the commutator and the carbon brush that are less likely to have a shorter service life.

DETAILED DESCRIPTION

Although one or more embodiments of the present disclosure will now be described with reference to the drawings, the present disclosure is not limited to the embodiments. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of a power tool.

The power tool includes a motor. A direction parallel to a motor rotation axis AX, which is the rotation axis of the motor, is referred to as an axial direction for convenience. A direction about the motor rotation axis AX is referred to as a circumferential direction or circumferentially, or a rotation direction for convenience. A direction radial from the motor rotation axis AX is referred to as a radial direction or radially for convenience. A position nearer the motor rotation axis AX in the radial direction, or a radial direction toward the motor rotation axis AX, is referred to as inward in the radial direction or radially inward for convenience. A position farther from the motor rotation axis AX in the radial direction, or a radial direction away from the motor rotation axis AX, is referred to as outward in the radial direction or radially outward for convenience. In the embodiments, the motor rotation axis AX extends in the front-rear direction. A first axial direction is from the rear to the front, and a second axial direction is from the front to the rear.

First Embodiment

A first embodiment will now be described. A power tool 1A according to the present embodiment is a disc grinder for polishing a workpiece. In the present embodiment, the power tool 1A is referred to as a grinder 1A for convenience.

Figure 1:
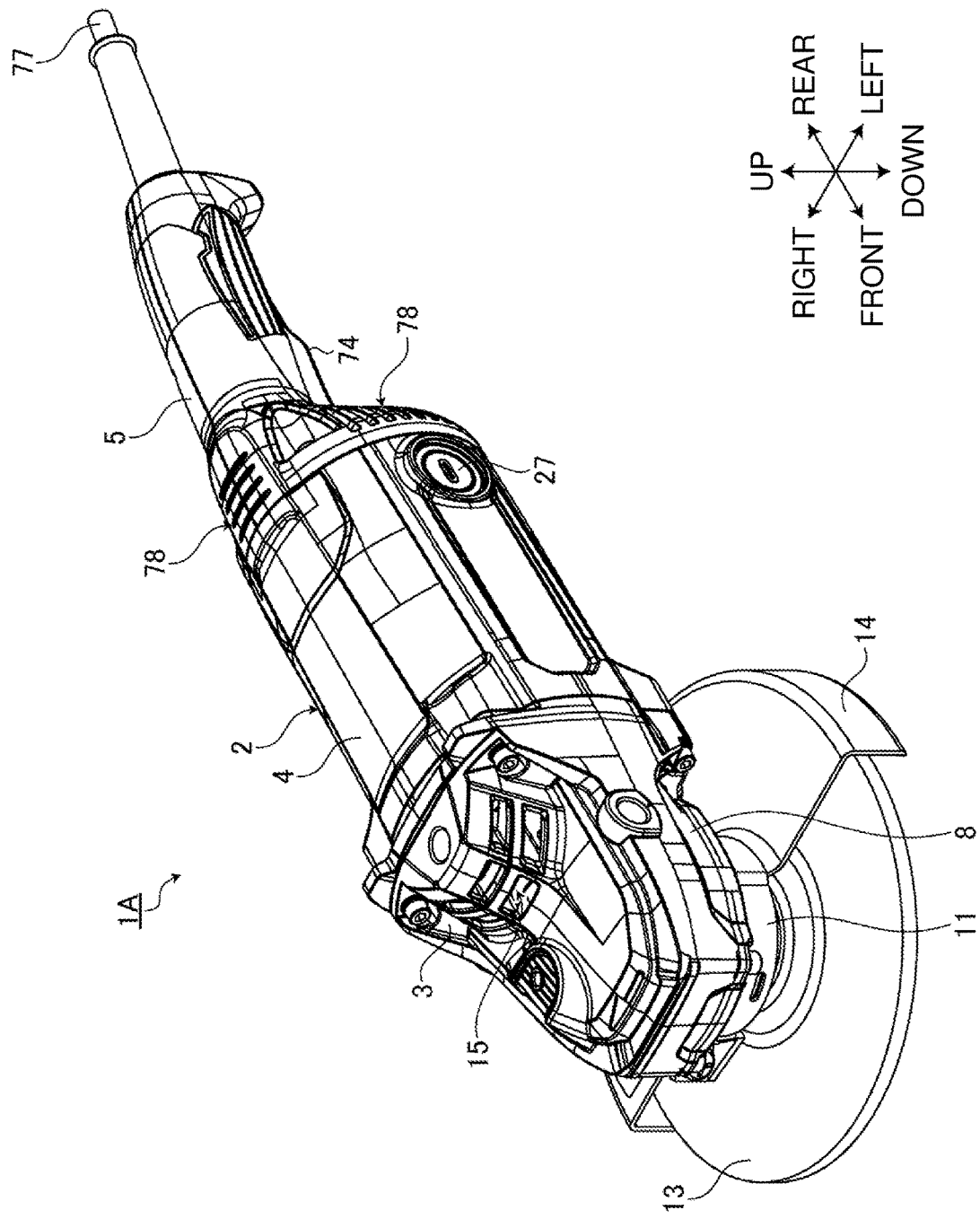
FIG. 1 is a front perspective view of a grinder according to a first embodiment.
Figure 2:
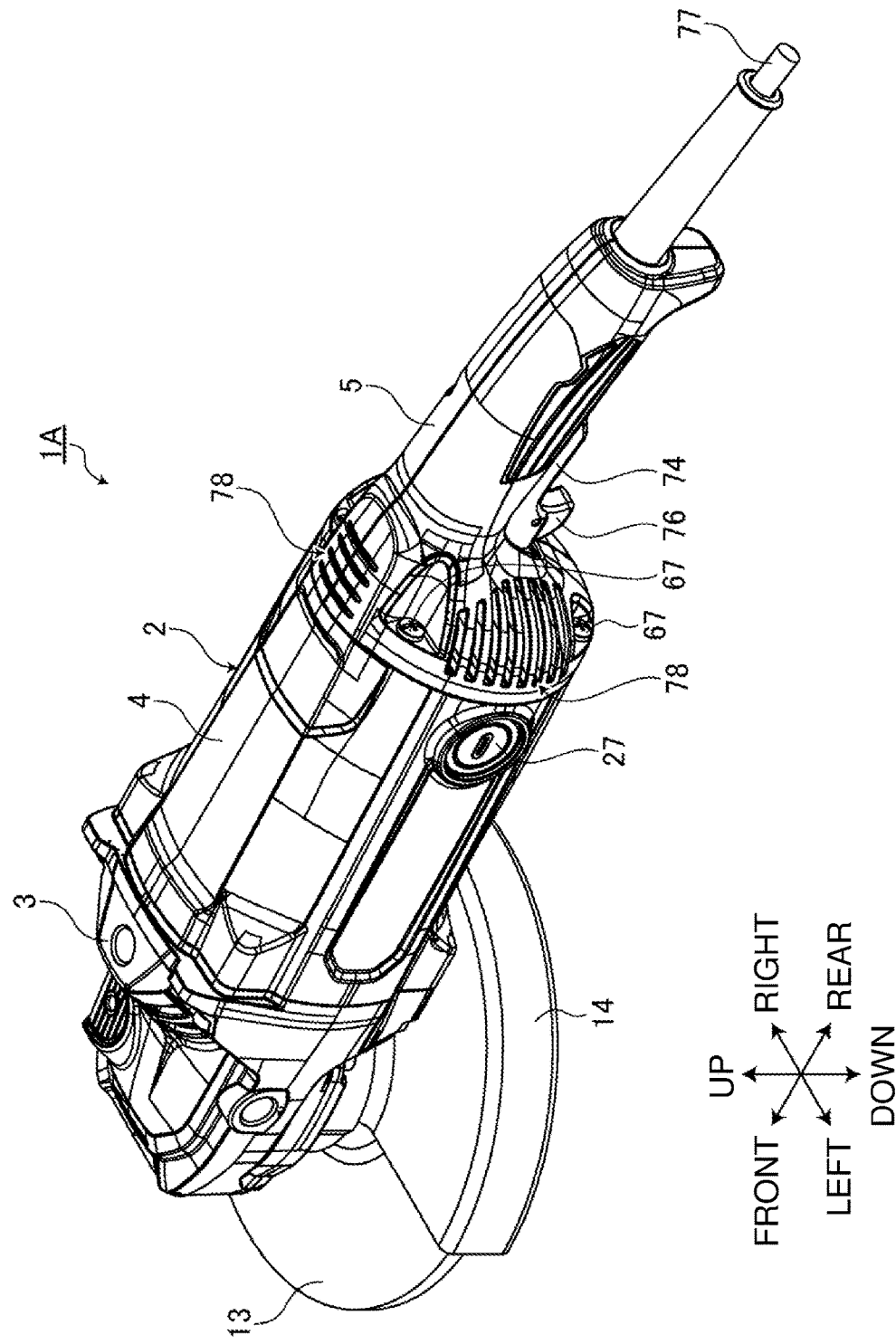
FIG. 2 is a rear perspective view of the grinder according to the first embodiment.
Figure 3:
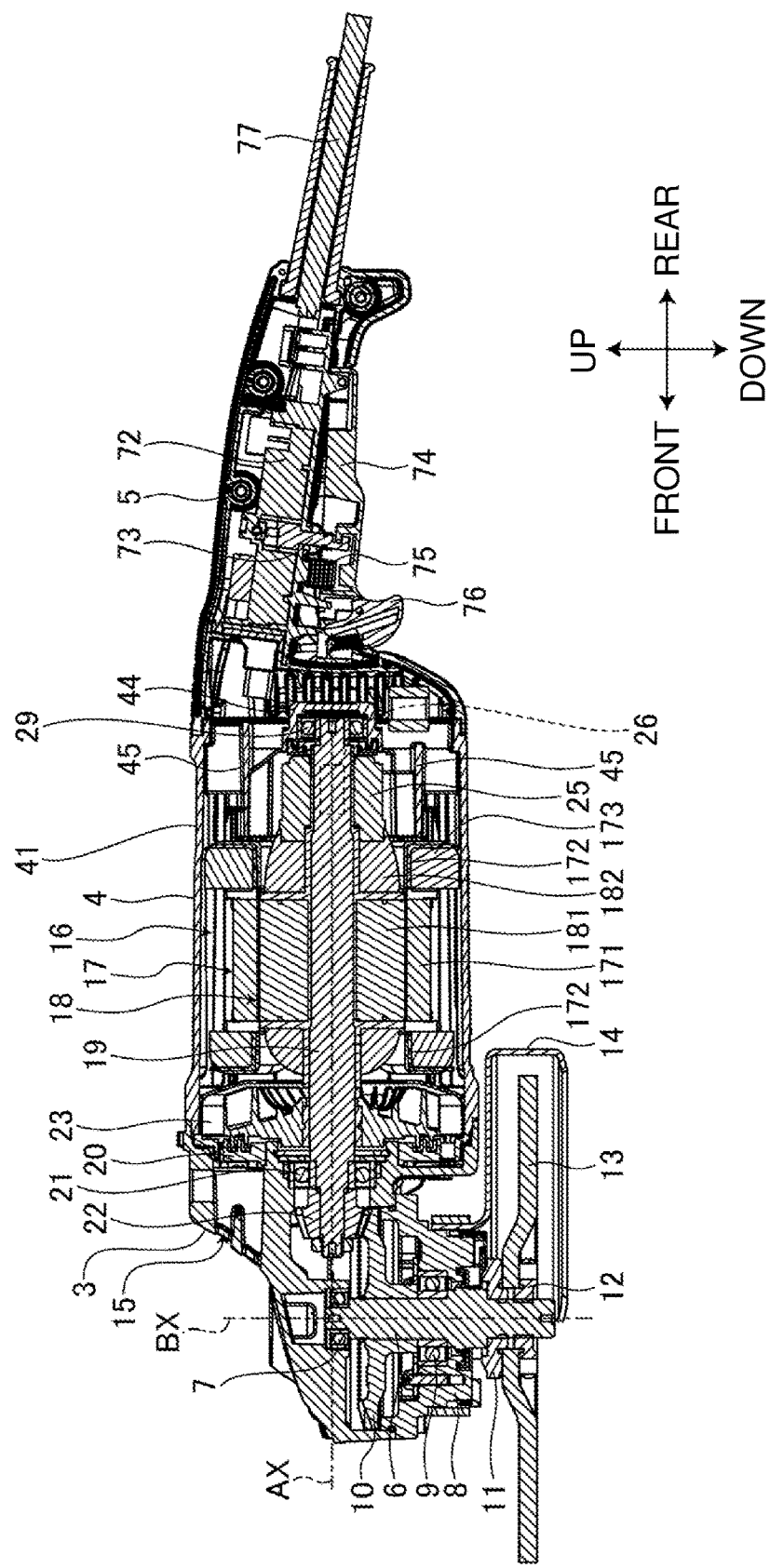
FIG. 3 is a sectional view of the grinder according to the first embodiment.
Figure 4:
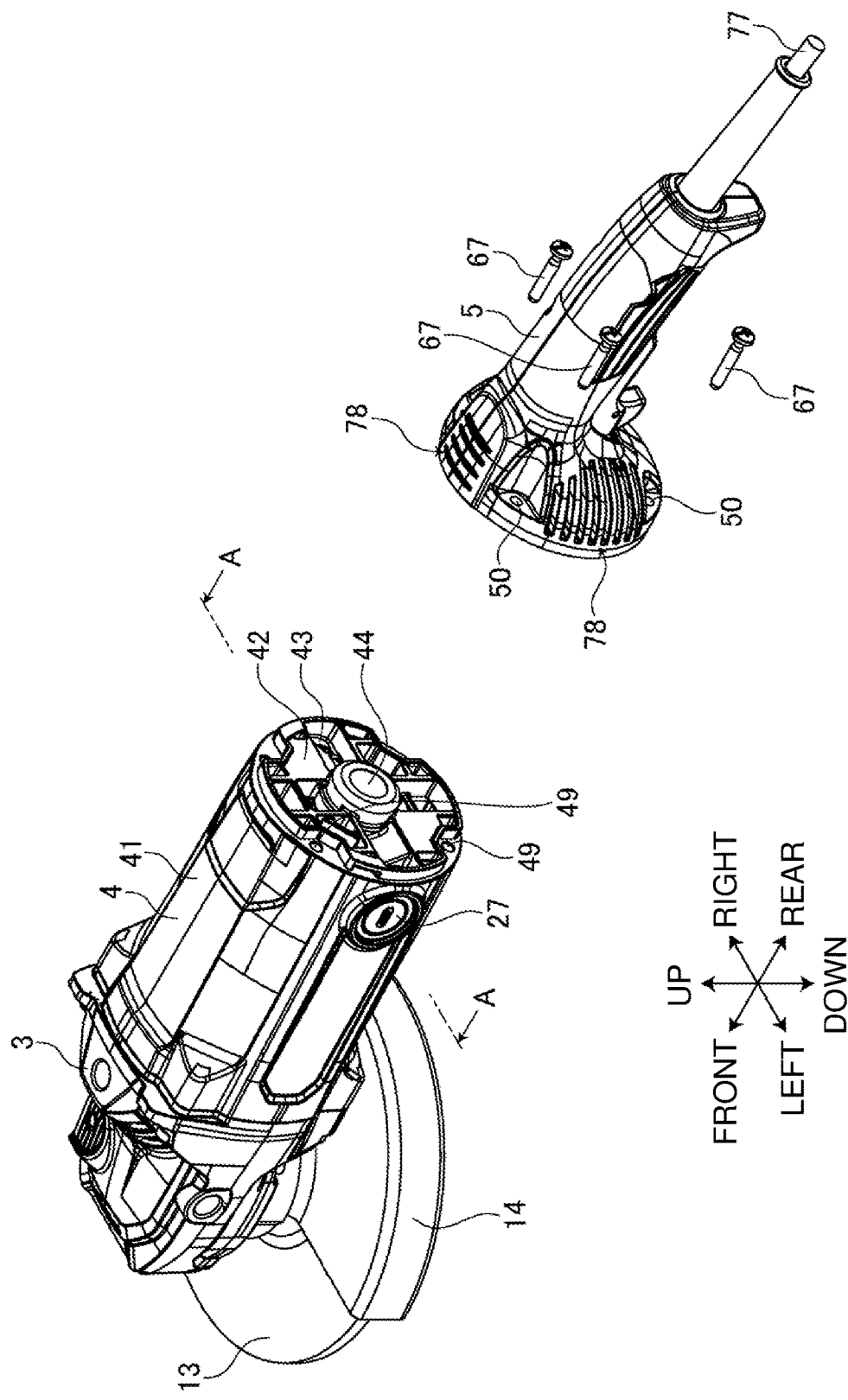
FIG. 4 is an exploded perspective view of the grinder according to the first embodiment as viewed from the rear.

FIG. 1 is a front perspective view of the grinder 1A according to the present embodiment. FIG. 2 is a rear perspective view of the grinder 1A. FIG. 3 is a sectional view of the grinder 1A. FIG. 4 is an exploded perspective view of the grinder 1A as viewed from the rear.

The grinder 1A includes a housing 2, a motor 16, and a spindle 6.

The housing 2 includes a gear housing 3, a motor housing 4, and a handle housing 5. The motor housing 4 is located behind the gear housing 3. The handle housing 5 is located behind the motor housing 4.

The gear housing 3 contains a spindle 6. The spindle 6 rotates about an output rotation axis BX that extends vertically. A retainer 8 is fixed to a lower portion of the gear housing 3. The spindle 6 has an upper portion rotatably supported by a bearing 7. The spindle 6 has a lower portion rotatably supported by a bearing 9. The bearing 7 is supported by the gear housing 3. The bearing 9 is supported by the retainer 8.

A bevel gear 10 is located on the upper portion of the spindle 6. The spindle 6 has its lower end protruding downward from the retainer 8. A grinding disc 13 is attached to the lower end of the spindle 6 with an inner flange 11 and an outer flange 12. A wheel cover 14 is fixed to the retainer 8. The wheel cover 14 covers a rear portion of the grinding disc 13. The gear housing 3 has multiple outlets 15 in its front portion.

The motor housing 4 contains the motor 16. The motor housing 4 includes a cylinder 41, a bottom 42, and multiple vents 43. The cylinder 41 surrounds the motor 16. The bottom 42 is connected to the rear end of the cylinder 41. The multiple vents 43 are located in the bottom 42. The bottom 42 covers an opening of the cylinder 41 in its rear end.

Figure 5:
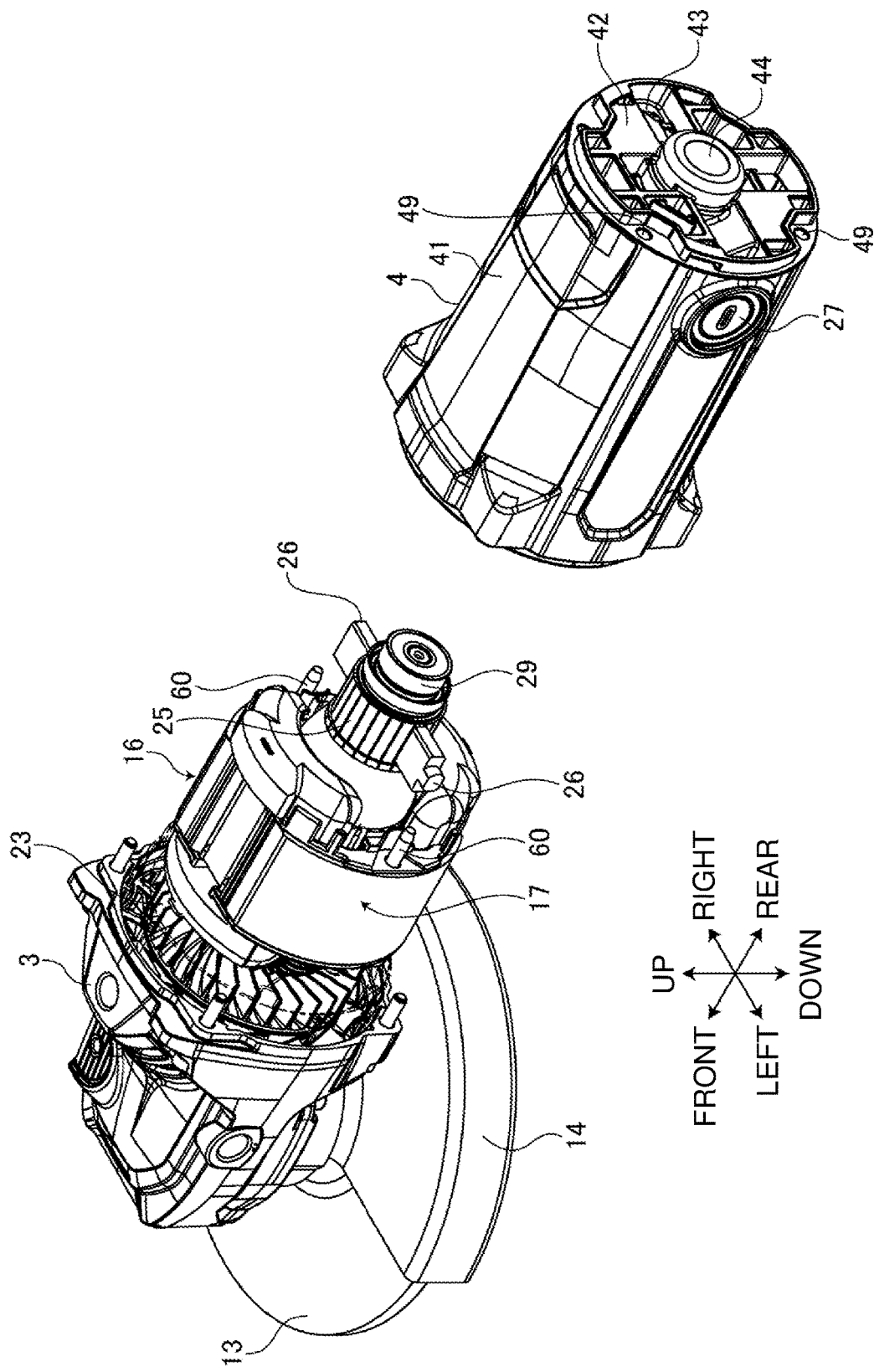
FIG. 5 is a partial exploded perspective view of the grinder according to the first embodiment as viewed from the rear.
Figure 6:
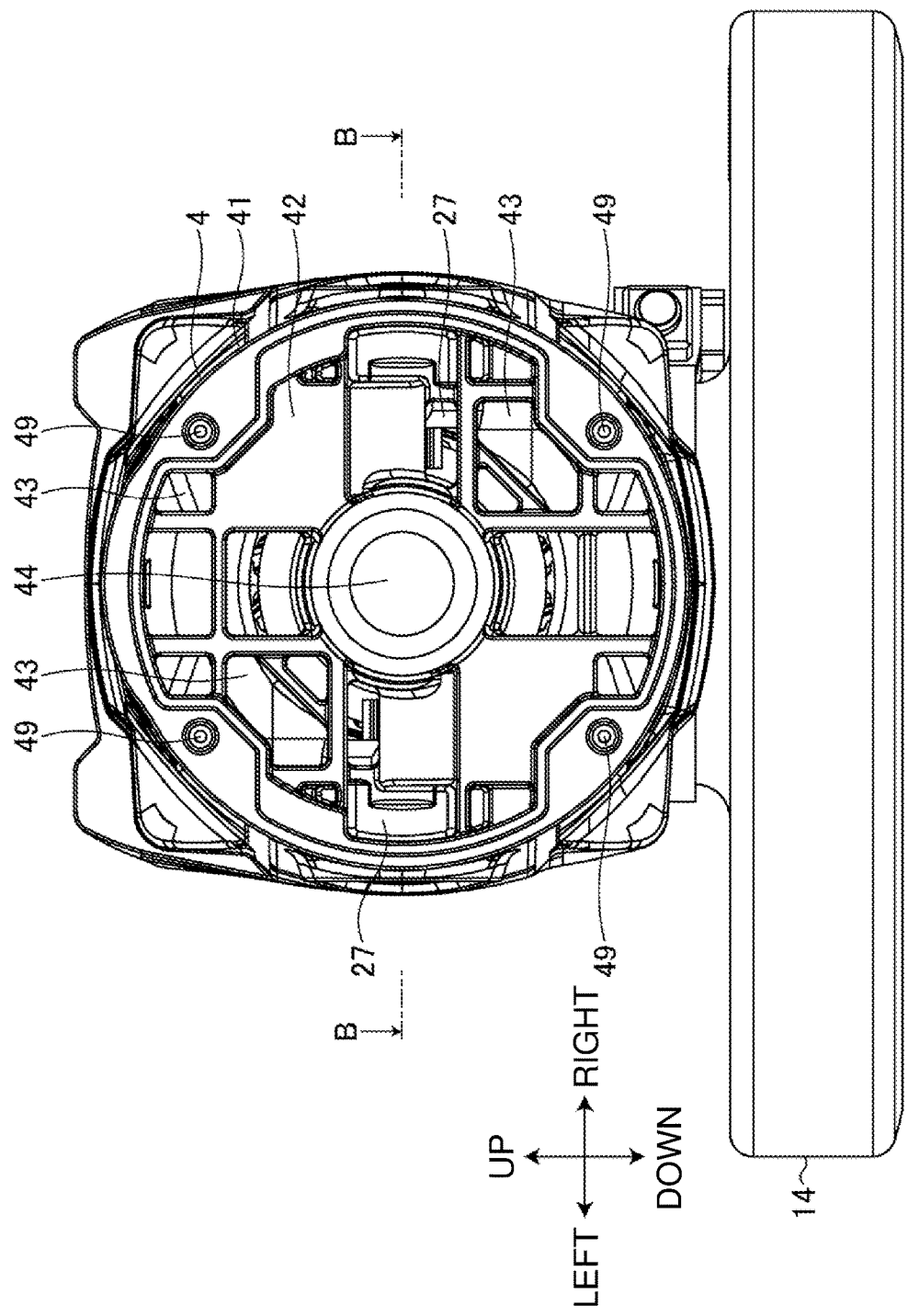
FIG. 6 is a rear view of a motor housing in the first embodiment.
Figure 7:
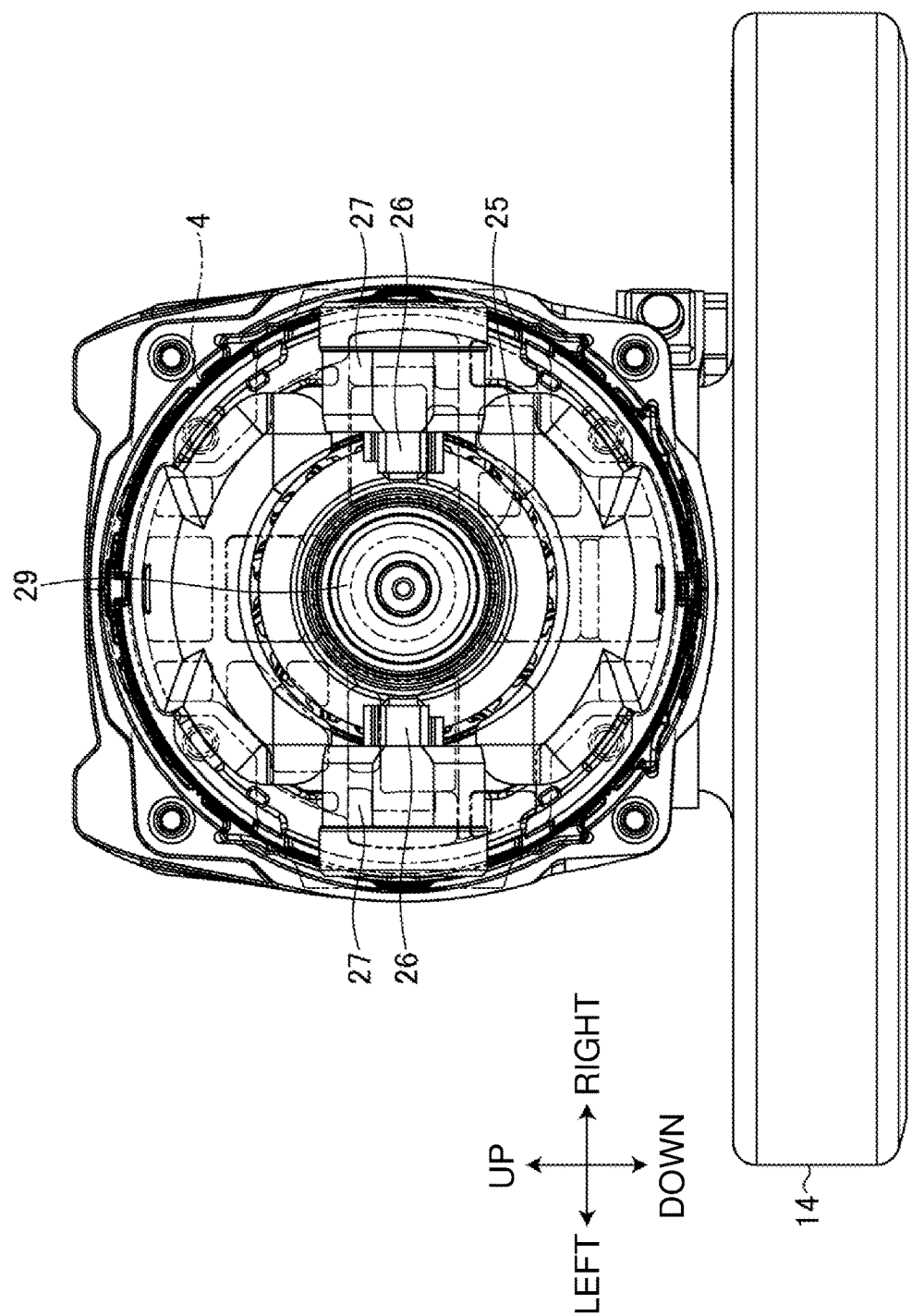
FIG. 7 is a rear view of the motor housing in the first embodiment.
Figure 8:
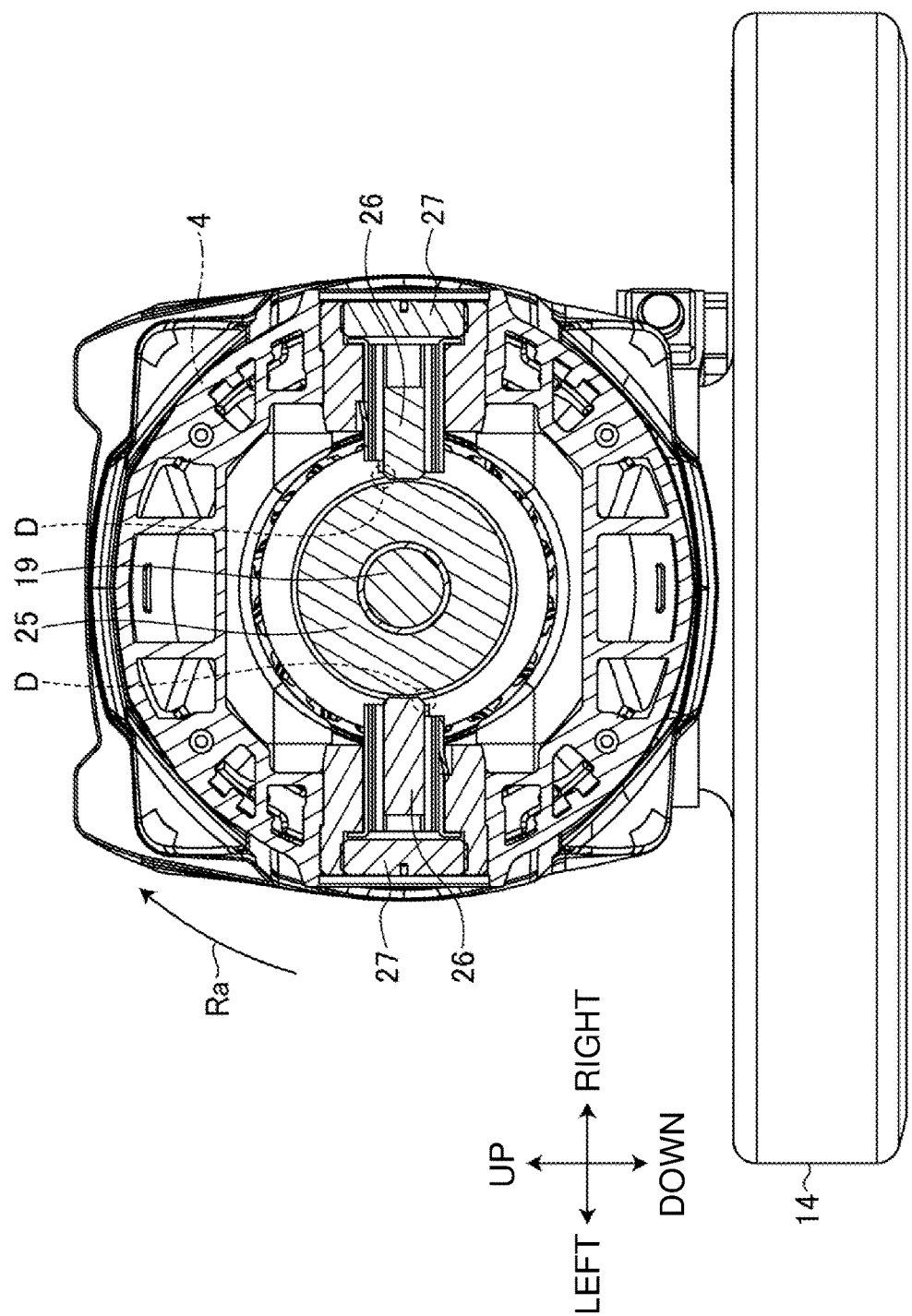
FIG. 8 is a partial sectional view of the grinder according to the first embodiment.
Figure 9:
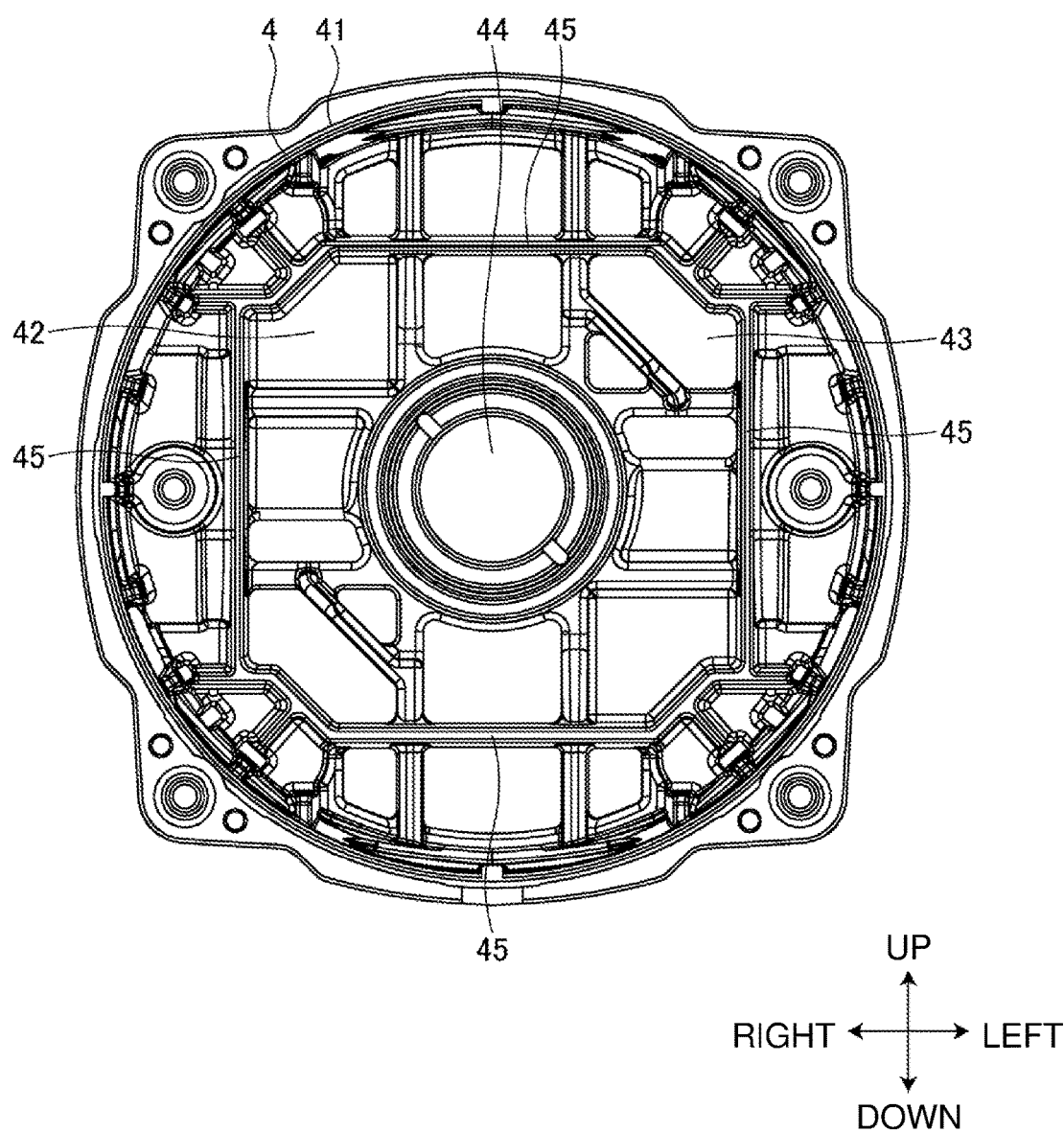
FIG. 9 is a front view of the motor housing in the first embodiment.
Figure 10:
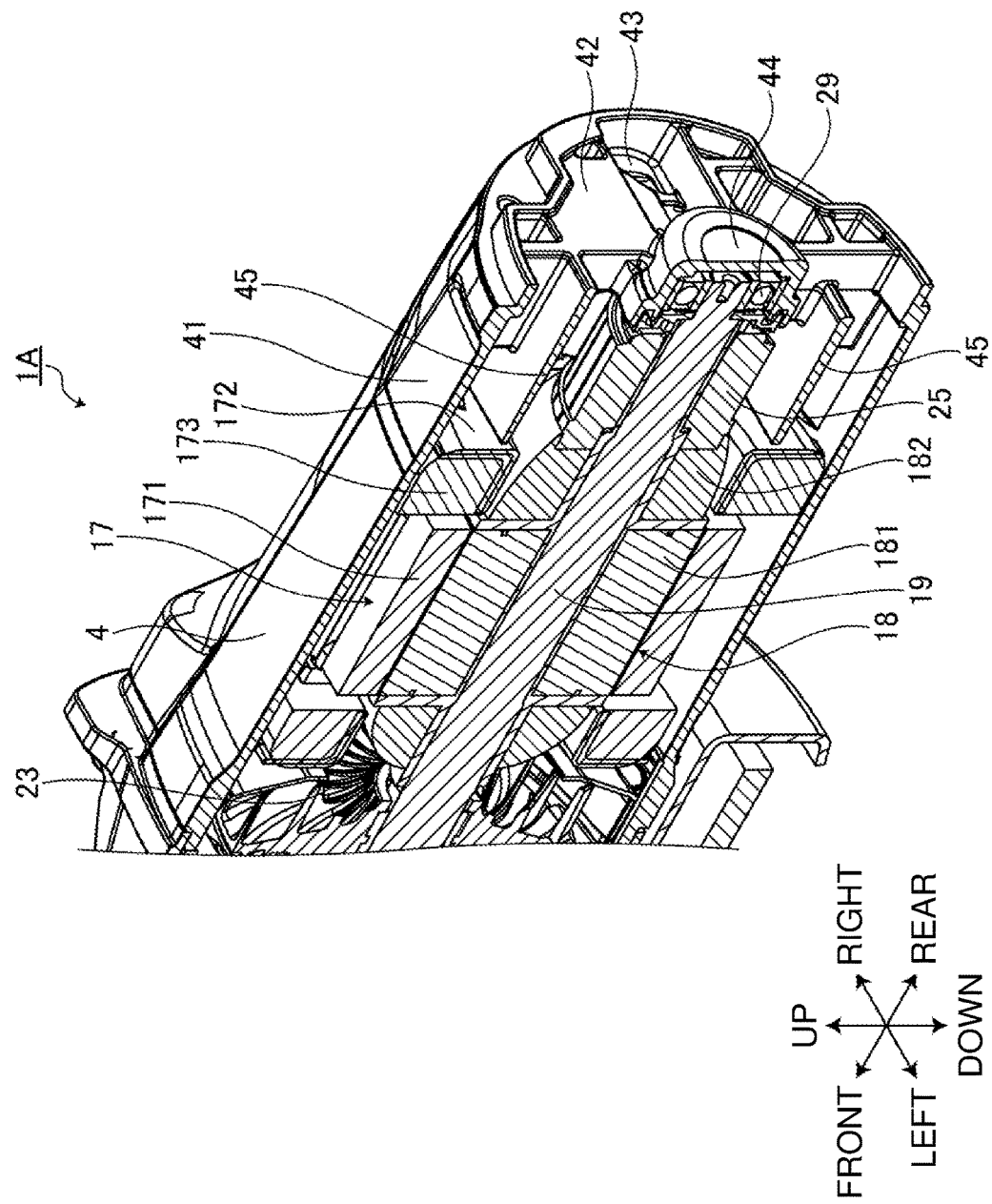
FIG. 10 is a partial perspective sectional view of the grinder according to the first embodiment.
Figure 11:
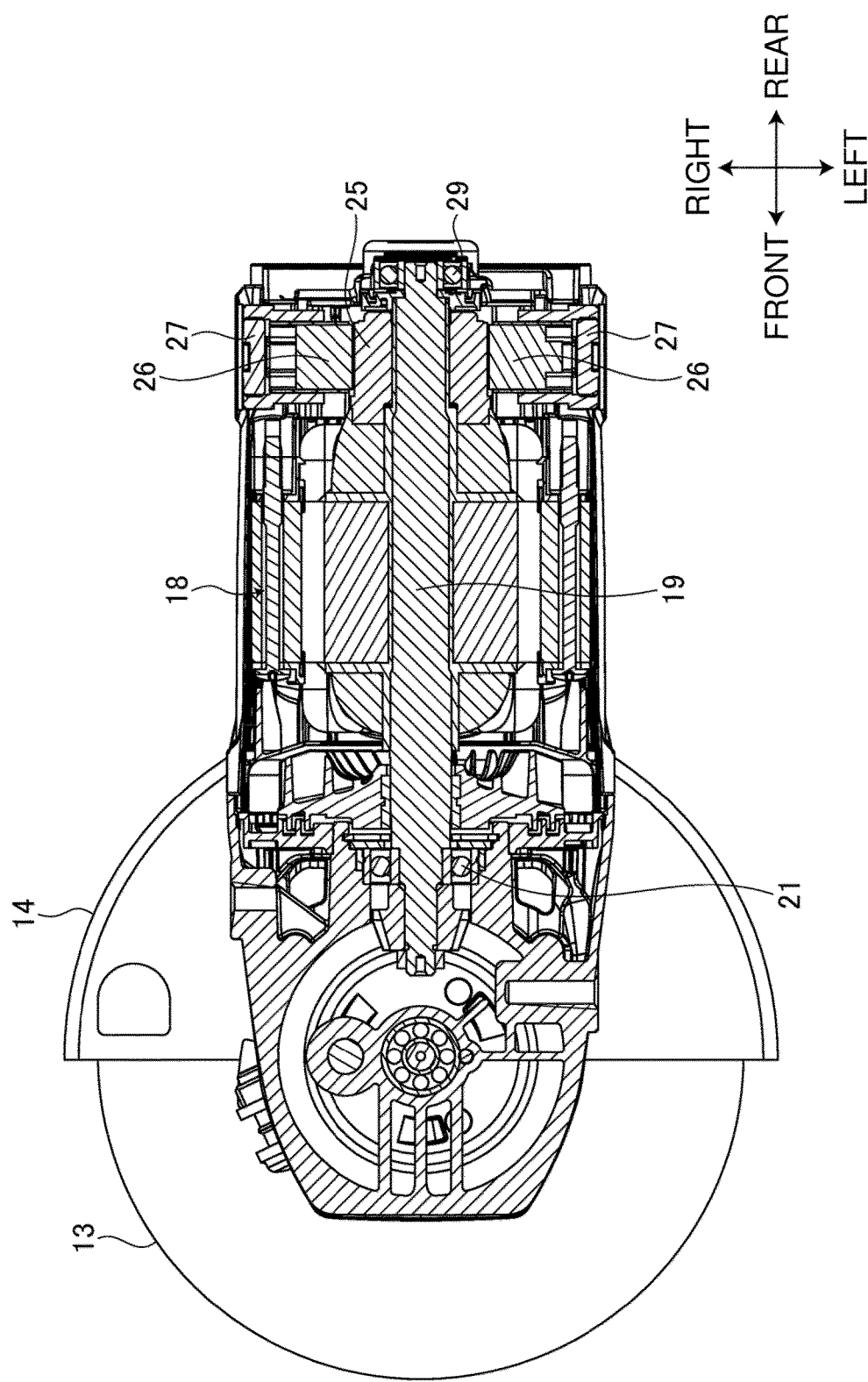
FIG. 11 is a partial sectional view of the grinder according to the first embodiment.

FIG. 5 is a partial exploded perspective view of the grinder 1A as viewed from the rear. FIGS. 6 and 7 are rear views of the motor housing 4. In FIG. 7, the motor housing 4 is indicated by an imaginary line. FIG. 8 is a partial sectional view of the grinder 1A. FIG. 8 is a sectional view taken along line A-A as viewed in the direction indicated by the arrows in FIG. 4. FIG. 9 is a front view of the motor housing 4. FIG. 10 is a partial perspective sectional view of the grinder 1A. FIG. 11 is a partial sectional view of the grinder 1A. FIG. 11 is a sectional view taken along line B-B as viewed in the direction indicated by the arrows in FIG. 6.

The motor 16 includes a stator 17, a rotor 18, and carbon brushes 26. The stator 17 is supported by the cylinder 41 in the motor housing 4. The stator 17 surrounds the rotor 18. The motor 16 is an inner-rotor motor. The rotor 18 rotates about the motor rotation axis AX extending in the front-rear direction.

The stator 17 includes a stator core 171, insulators 172, and coils 173. The insulators 172 are fixed to the stator core 171. The coils 173 are supported by the insulators 172.

The stator core 171 and the insulators 172 are fastened together with screws 60. The insulators 172 are at least partially located frontward from the stator core 171. The insulators 172 are at least partially located rearward from the stator core 171. The coils 173 are wound around the stator core 171 with the insulators 172 in between.

The rotor 18 includes a rotor core 181, coils 182, a rotor shaft 19, a fan 23, and a commutator 25. The coils 182 are supported by the rotor core 181. The rotor shaft 19 is fixed to the rotor core 181. The fan 23 is fixed to the rotor shaft 19. The commutator 25 is fixed to the rotor shaft 19.

The rotor shaft 19 includes its front portion protruding frontward from the rotor core 181 and the coils 182. The rotor shaft 19 includes its rear portion protruding rearward from the rotor core 181 and the coils 182.

The fan 23 is fixed to the front portion (first portion) of the rotor shaft 19 frontward from the middle of the rotor shaft 19 in the front-rear direction. The fan 23 is located frontward from the rotor core 181 and the coils 182.

The commutator 25 is fixed to the rear portion (second portion) of the rotor shaft 19 located rearward from the middle of the rotor shaft 19 in the front-rear direction. The commutator 25 is located rearward from the rotor core 181 and the coils 182. The bottom 42 is located rearward from the commutator 25. The commutator 25 includes multiple commutator tabs.

A partition 20 is located between the motor housing 4 and the gear housing 3. The rotor shaft 19 has its front end extending through the partition 20. A bevel gear 22 is located at the front end of the rotor shaft 19. The bevel gear 22 meshes with the bevel gear 10 on the spindle 6 inside the gear housing 3.

The rotor shaft 19 has its front portion rotatably supported by a bearing 21. The rotor shaft 19 has its rear portion rotatably supported by a bearing 29. The bearing 21 is supported on the gear housing 3. The bearing 29 is supported on the bottom 42. The bottom 42 includes a bearing retainer 44 retaining the bearing 29.

The carbon brushes 26 are in contact with the commutator 25. The carbon brushes 26 are located on the left and right of the commutator 25. The carbon brushes 26 are held by respective brush holders 27. The brush holders 27 are supported by the cylinder 41 in the motor housing 4. The carbon brushes 26 are in contact with the commutator 25.

The handle housing 5 contains a switch 72. A plunger 73 protrudes downward from the switch 72. A switch lever 74 is located below the handle housing 5. The front end of the switch lever 74 is swingable in the vertical direction using the rear end of the switch lever 74 as a fulcrum. The switch lever 74 is urged downward by a coil spring 75. The switch lever 74 is at a downward swing position to turn off the switch 72. The operator can push the switch lever 74 upward with the hand gripping the handle housing 5. The plunger 73 is then pushed to turn on the switch 72. The switch lever 74 has a lock lever 76 at its front end, which is rotatable in the front-rear direction. The lock lever 76 is rotatable to a position selected from an unlocking position, a neutral position, and a locking position. At the unlocking position, the lock lever 76 restricts the switch lever 74 from being pushed. At the neutral position, the lock lever 76 permits the switch lever 74 to be pushed. At the locking position, the lock lever 76 maintains the switch lever 74 in the pushed state. A power cable 77 is connected to the rear end of the handle housing 5.

The motor housing 4 and the handle housing 5 are fastened together with multiple screws 67. The handle housing 5 has openings 50 in its front end. The screws 67 are received in the openings 50. The motor housing 4 has threaded holes 49 in its rear end. The threaded holes 49 are connected to threaded portions on the screws 67.

The handle housing 5 has multiple inlets 78 in its front portion. When the fan 23 rotates as the rotor shaft 19 rotates, air around the housing 2 flows into the handle housing 5 through the inlets 78 and into the motor housing 4 through the vents 43. Air flowing into the motor housing 4 flows around the motor 16 and cools the motor 16, then flows into the gear housing 3, and is discharged out of the housing 2 through the outlets 15.

The power tool 1A according to the present embodiment includes ribs 45 protruding from the bottom 42. Each rib 45 protrudes frontward from the bottom 42. Each rib 45 has a rear end portion at its rear connected to the front surface of the bottom 42 at its front. Each rib 45 has a front end on its front facing the rear surface of the insulator 172 located rearward from the stator core 171.

The ribs 45 have their front ends located frontward from the carbon brushes 26. The ribs 45 at least partially surround the commutator 25. The ribs 45 have their front ends at least partially surrounding the coils 173 located rearward from the stator core 171.

Figure 12:
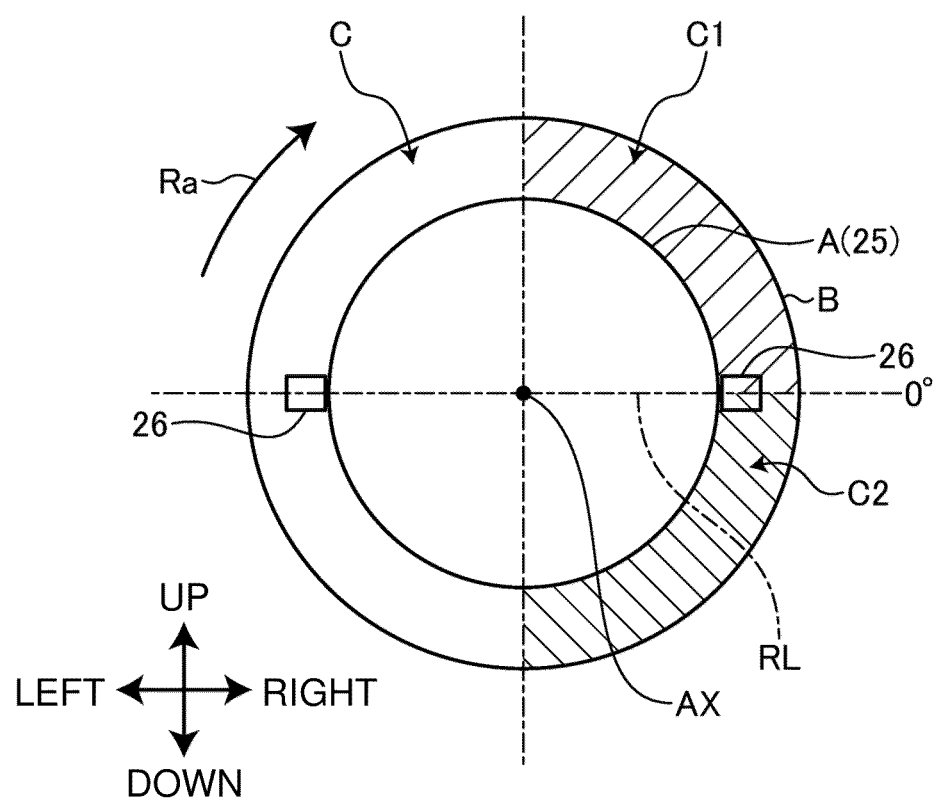
FIG. 12 is a schematic diagram of the motor housing in the first embodiment as viewed from the rear.

FIG. 12 is a schematic diagram of the motor housing 4 as viewed from the rear. In the present embodiment, as shown in FIGS. 8 and 12, the rotor 18 rotates clockwise, or in one direction, as indicated by an arrow Ra when the motor housing 4 (motor 16) is viewed from the rear.

As shown in FIG. 12, a predetermined plane perpendicular to the motor rotation axis AX includes a first reference circle A, a second reference circle B, and an annular range C. The first reference circle A has a diameter that is one times the outer diameter of the commutator 25 and centered on the motor rotation axis AX. The second reference circle B has a diameter that is 1.5 times the outer diameter of the commutator 25 and centered on the motor rotation axis AX. The annular range C is defined between the first reference circle A and the second reference circle B. A position at which the second reference circle B intersects with a reference line RL passing through the motor rotation axis AX and the centers of the carbon brushes 26 in the predetermined plane is a 0° position. P1 is the opening ratio of the vents 43 in a first section C1 of the annular range C from the 0° position to a 90° position in the counter-rotation direction of the rotor 18. P2 is the opening ratio of the vents 43 in a second section C2 of the annular range C from the 0° position to a 90° position in the forward-rotation direction of the rotor 18. In this case, the motor housing 4 satisfies the following condition.

$$P1 < P2 \qquad (1)$$

The opening ratio of the vents 43 refers to the proportion of the vents 43 in the bottom 42 per unit area. The bottom 42 has an outer diameter greater than 1.5 times the outer diameter of the commutator 25. The bottom 42 may have an outer diameter that is 1.6 to 5.0 times inclusive the outer diameter of the commutator 25. The reference line RL extends in the lateral direction to pass through the motor rotation axis AX in the predetermined plane.

When the rotor 18 and the fan 23 rotate in the direction indicated by the arrow Ra, air around the housing 2 flows into the handle housing 5 through the inlets 78 and flows into the motor housing 4 through the vents 43. Dust sucked through the inlets 78 may flow into the motor housing 4 through the vents 43. Dust flowing into the motor housing 4 is blown onto, for example, the contact points shown in portions D in FIG. 8. Each contact point is between the commutator 25 and the corresponding carbon brush 26. Dust may then be trapped between the commutator 25 and the carbon brushes 26. When the commutator 25 rotates in this state, the dust functions as a polishing agent and causes wear of the commutator 25 and the carbon brushes 26 and lowers the durability of the motor 16.

In the present embodiment, the position and the size of the vents 43 are adjusted, and the ribs 45 are located to satisfy the condition of Formula 1. This reduces dust being blown onto the portions D shown in FIG. 8. This reduces the wear of the commutator 25 and the carbon brushes 26, thus improving the durability (wear resistance) of the motor 16.

As described above, the motor 16 in the grinder 1A according to the present embodiment includes the rotor 18, the fan 23, the commutator 25, the stator 17, and the carbon brushes 26. The rotor 18 includes the rotor shaft 19. The rotor 18 is rotatable in one direction about the motor rotation axis AX extending along a predetermined axis (front-rear direction). The fan 23 is fixed to the first portion of the rotor shaft 19 in the first direction from the middle of the rotor shaft 19 along the predetermined axis. The commutator 25 is fixed to the second portion of the rotor shaft 19 in the second direction from the middle of the rotor shaft 19 along the predetermined axis. The stator 17 surrounds the rotor 18. The carbon brushes 26 are in contact with the commutator 25.

The motor housing 4 in the grinder 1A according to the present embodiment includes the cylinder 41, the bottom 42, the vents 43, and the ribs 45. The motor housing 4 supports the stator 17. The cylinder 41 surrounds the motor 16. The bottom 42 is located in the second direction from the commutator 25 and is connected to the cylinder 41. The vents 43 are located in the bottom 42. Each rib 45 protrudes from the bottom 42 in the first direction, and has its first end in the first direction located in the first direction from the carbon brushes 26.

The predetermined plane perpendicular to the motor rotation axis AX includes the first reference circle A having a diameter that is one times the outer diameter of the commutator 25 and centered on the motor rotation axis AX, the second reference circle B having a diameter that is 1.5 times the diameter of the commutator 25 and centered on the motor rotation axis AX, and the annular range C between the first reference circle A and the second reference circle B. P1<P2, where, when the position at which the second reference circle B intersects with the reference line RL passing through the motor rotation axis AX and the centers of the carbon brushes 26 in the predetermined plane is the 0° position, P1 is the opening ratio of the vents 43 in the first section of the annular range from the 0° position to the 90° position in the counter-rotation direction of the rotor 18, and P2 is the opening ratio of the vents 43 in the second section of the annular range from the 0° position to the 90° position in the forward-rotation direction of the rotor 18.

The above structure reduces dust entering between the commutator 25 and the carbon brushes 26. As the fan 23 rotates, dust around the housing 2 may enter the motor housing 4 through the inlets 78 and the vents 43. The ribs 45 reduce dust entering between the commutator 25 and the carbon brushes 26. The structure satisfying the condition P1<P2 reduces dust entering between the commutator 25 and the carbon brushes 26. The commutator 25 and the carbon brushes 26 are thus less likely to have a shorter service life.

The ribs 45 in the present embodiment may at least partially surround the commutator 25.

This reduces dust entering between the commutator 25 and the carbon brushes 26.

In the present embodiment, each rib 45 may have its end in the second direction connected to the surface of the bottom 42 in the first direction.

This fixes the ribs 45 in position.

The ribs 45 in the present embodiment may be integral with the bottom 42.

The grinder 1A with this structure includes fewer parts.

The stator 17 in the present embodiment may include the stator core 171, the insulators 172 fixed to the stator core 171, and the coils 173 supported on the insulators 172. Each rib 45 may have its end in the first direction facing the corresponding insulator 172.

This reduces dust entering between the commutator 25 and the carbon brushes 26.

In the present embodiment, each rib 45 may have its end in the first direction at least partially surrounding the coils 173.

This reduces dust entering between the commutator 25 and the carbon brushes 26.

The grinder 1A according to the present embodiment may include the bearing 29 supporting the other end of the rotor shaft 19. The bottom 42 may include the bearing retainer 44 retaining the bearing 29.

The rotor shaft 19 is thus supported on the bottom 42 with the bearing 29.

Second Embodiment

A second embodiment will now be described. Like reference numerals hereafter denote like or corresponding components in the above embodiment. Such components will be described briefly or will not be described.

Figure 13:
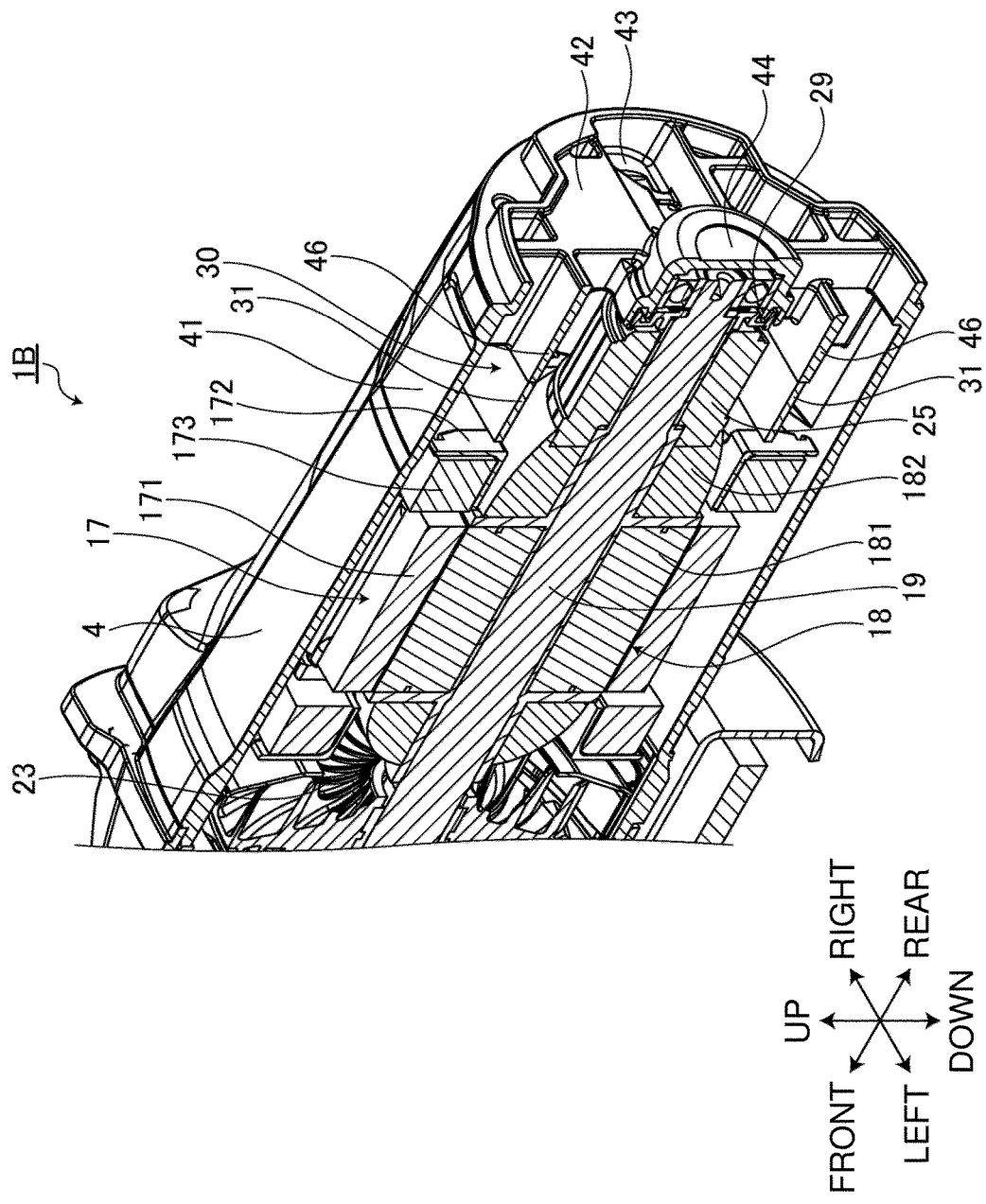
FIG. 13 is a partial perspective sectional view of a grinder according to a second embodiment.
Figure 14:
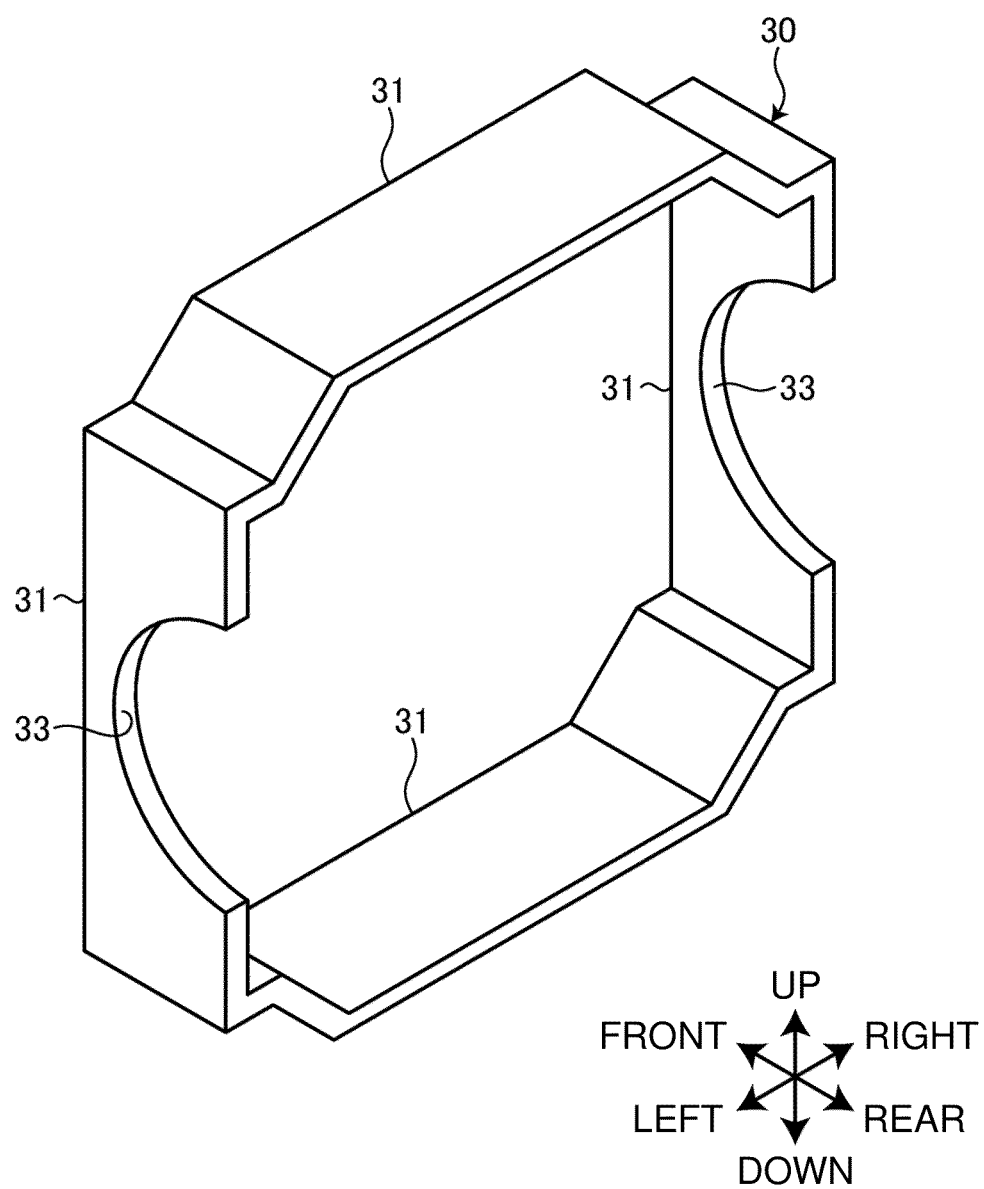
FIG. 14 is a perspective view of a rib member in the second embodiment.

FIG. 13 is a partial perspective sectional view of a grinder 1B according to the present embodiment. FIG. 14 is a perspective view of a rib member 30. As shown in FIGS. 13 and 14, ribs 31 may be separate from the bottom 42. The ribs 31 are located on the rib member 30 separate from the motor housing 4. As shown in FIG. 14, the rib member 30 has recesses 33 receiving the brush holders 27.

As described above, the ribs 31 in the present embodiment may be separate from the bottom 42.

This allows the ribs 31 to be easily formed into any shape.

The ribs 31 in the present embodiment may have the recesses 33 receiving the brush holders 27.

This reduces interference between the brush holders 27 and the ribs 31.

Third Embodiment

A third embodiment will now be described. Like reference numerals hereafter denote like or corresponding components in the above embodiments. Such components will be described briefly or will not be described.

Figure 15:
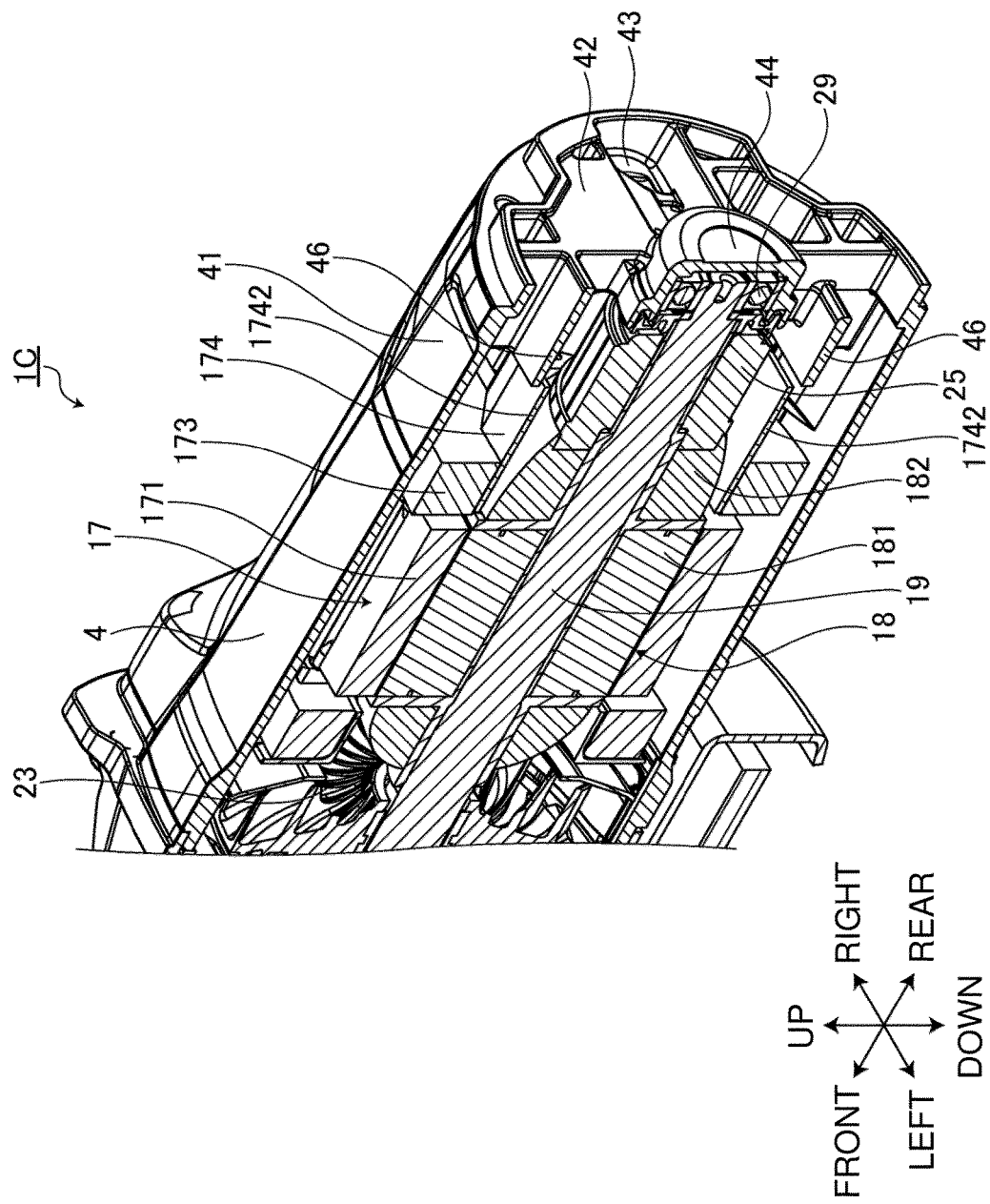
FIG. 15 is a partial perspective sectional view of a grinder according to a third embodiment.
Figure 16:
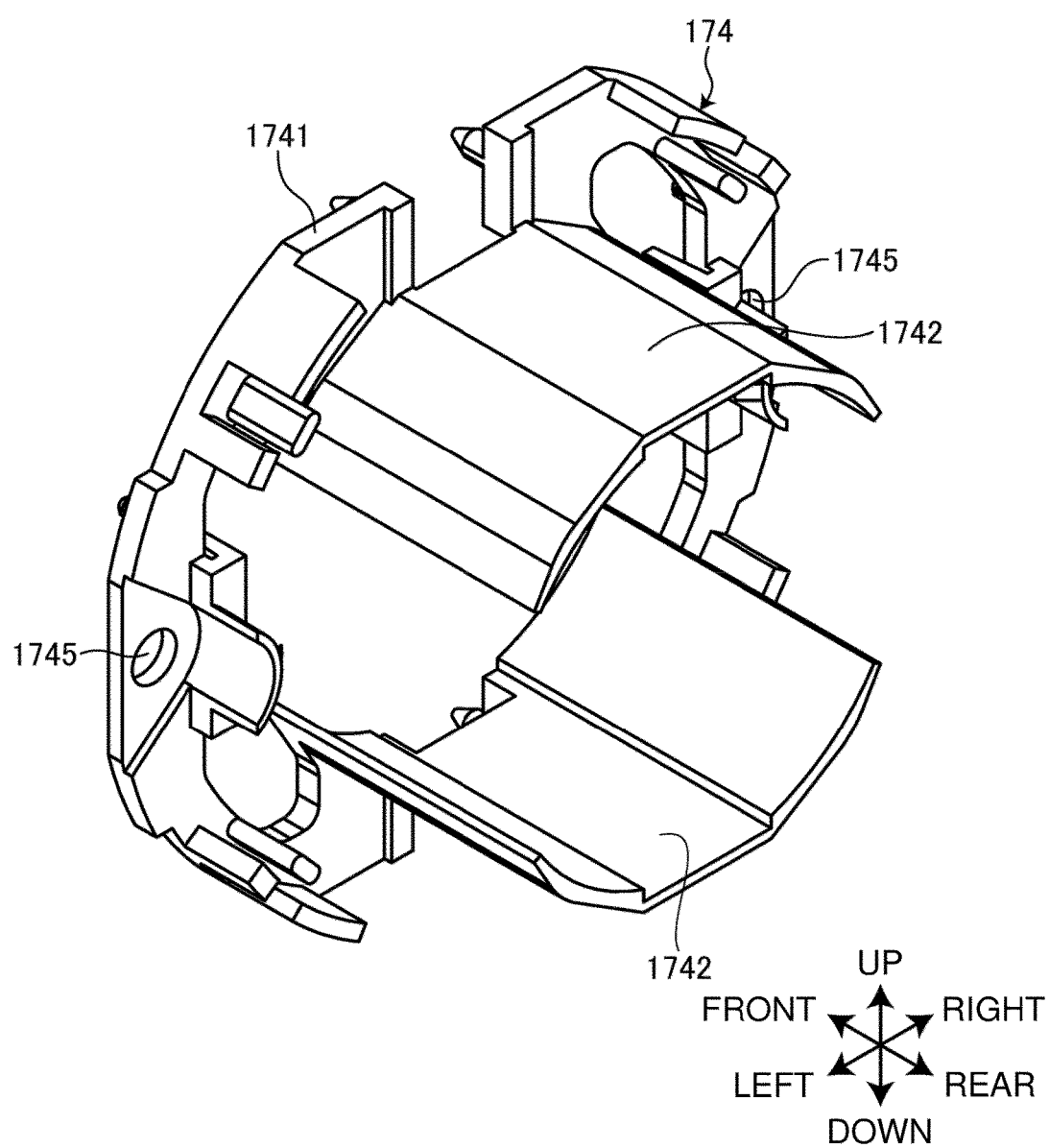
FIG. 16 is a perspective view of an insulator in the third embodiment.

FIG. 15 is a partial perspective sectional view of a grinder 1C according to the present embodiment. FIG. 16 is a perspective view of an insulator 174.

The grinder 1C according to the present embodiment includes ribs 1742 protruding from the insulator 174.

The insulator 174 includes an insulator unit 1741 and the ribs 1742. The insulator unit 1741 is fixed to the rear end of the stator core 171. The ribs 1742 protrude rearward from the insulator unit 1741. The ribs 1742 are integral with the insulator 174.

Each rib 1742 has its rear end as an end in the second direction located rearward from the front ends of the carbon brushes 26 as their ends in the first direction. Each rib 1742 has its rear end at least partially surrounding the commutator 25. Each rib 1742 has its front end connected to the insulator unit 1741. Each rib 1742 has its rear end facing the front surface of the bottom 42 as the surface in the first direction.

The stator core 171 and the insulator 174 are fastened together with the screws 60. The insulator unit 1741 has openings 1745 receiving the screws 60.

As described above, the structure according to the present embodiment also reduces dust entering between the commutator 25 and the carbon brushes 26. As the fan 23 rotates, dust around the housing 2 may enter the motor housing 4 through the inlets 78 and the vents 43. The ribs 1742 reduce dust entering between the commutator 25 and the carbon brushes 26. The commutator 25 and the carbon brushes 26 are thus less likely to have a shorter service life.

Fourth Embodiment

A fourth embodiment will now be described. Like reference numerals hereafter denote like or corresponding components in the above embodiments. Such components will be described briefly or will not be described.

Figure 17:
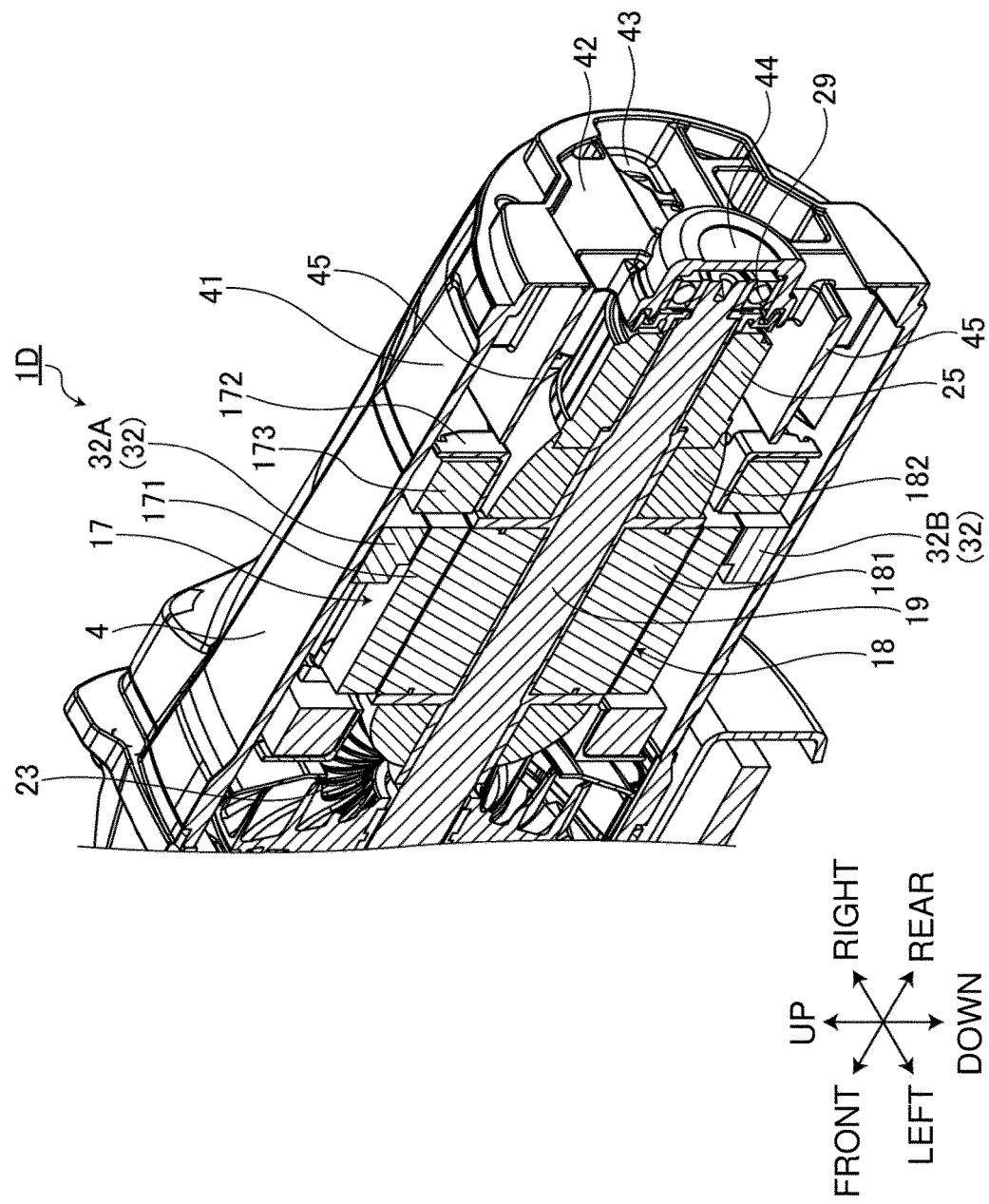
FIG. 17 is a partial perspective sectional view of a grinder according to a fourth embodiment.
Figure 18:
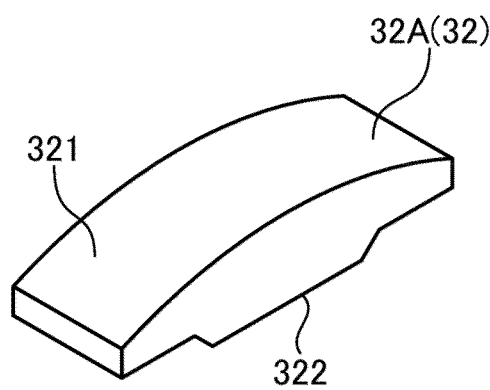
FIG. 18 is a perspective view of inner baffles in the fourth embodiment.
Figure 18:
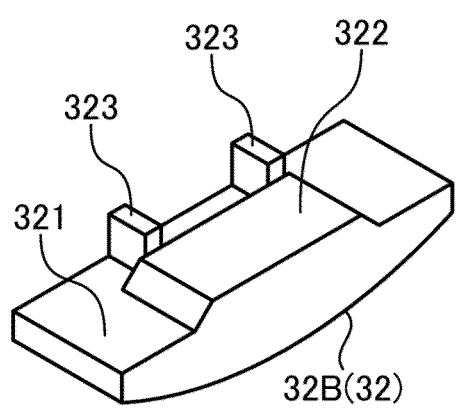
Figure 18:
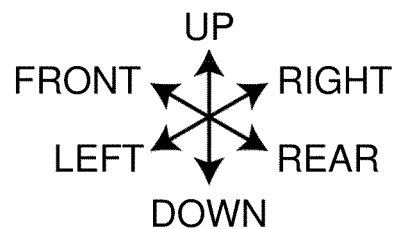

FIG. 17 is a partial perspective sectional view of a grinder 1D according to the present embodiment. FIG. 18 is a perspective view of inner baffles 32.

In the present embodiment, the inner baffles 32 are located between the outer circumferential surface of the stator core 171 and the inner circumferential surface of the cylinder 41. The inner baffles 32 include an inner baffle 32A and an inner baffle 32B. The inner baffle 32A is located between an upper portion of the outer circumferential surface of the stator core 171 and the inner circumferential surface of the cylinder 41. The inner baffle 32B is located between a lower portion of the outer circumferential surface of the stator core 171 and the inner circumferential surface of the cylinder 41. In the example shown in FIG. 17, the inner baffle 32A is at least partially located at a 90° position in the counter-rotation direction of the rotor 18 from the 0° position. The inner baffle 32B is at least partially located at a 90° position in the forward-rotation direction of the rotor 18 from the 0° position.

Each inner baffle 32 includes a body 321, a protrusion 322, and positioners 323. The body 321 includes an arc-shaped outer circumferential surface conforming to the inner circumferential surface of the cylinder 41. The protrusion 322 protrudes radially inward from the body 321 and is in contact with the outer circumferential surface of the stator core 171. The positioners 323 are received in recesses on the stator core 171.

The inner baffles 32 prevent air flowing into the motor housing 4 through the vents 43 from passing between the outer circumferential surface of the stator core 171 and the inner circumferential surface of the cylinder 41. This improves the airflow and reduces accumulation of dust near the commutator 25 and the carbon brushes 26.

As described above, the structure according to the present embodiment also reduces dust entering between the commutator 25 and the carbon brushes 26. As the fan 23 rotates, dust around the housing 2 may enter the motor housing 4 through the inlets 78 and the vents 43. The inner baffles 32 improve airflow and reduce accumulation of dust near the commutator 25 and the carbon brushes 26. This reduces dust entering between the commutator 25 and the carbon brushes 26. The commutator 25 and the carbon brushes 26 are thus less likely to have a shorter service life.

Fifth Embodiment

A fifth embodiment will now be described. Like reference numerals hereafter denote like or corresponding components in the above embodiments. Such components will be described briefly or will not be described.

Figure 19:
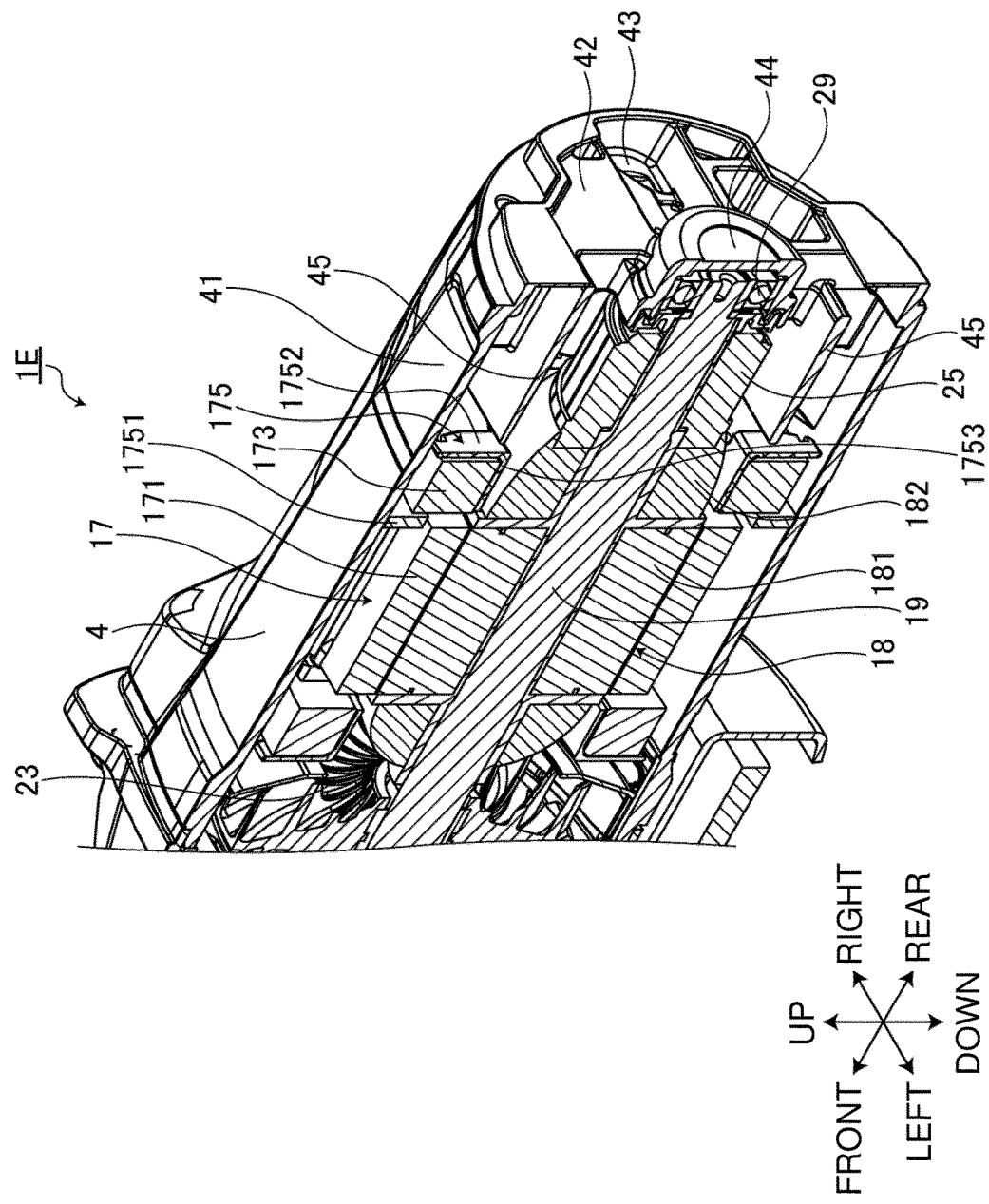
FIG. 19 is a partial perspective sectional view of a grinder according to a fifth embodiment.
Figure 20:
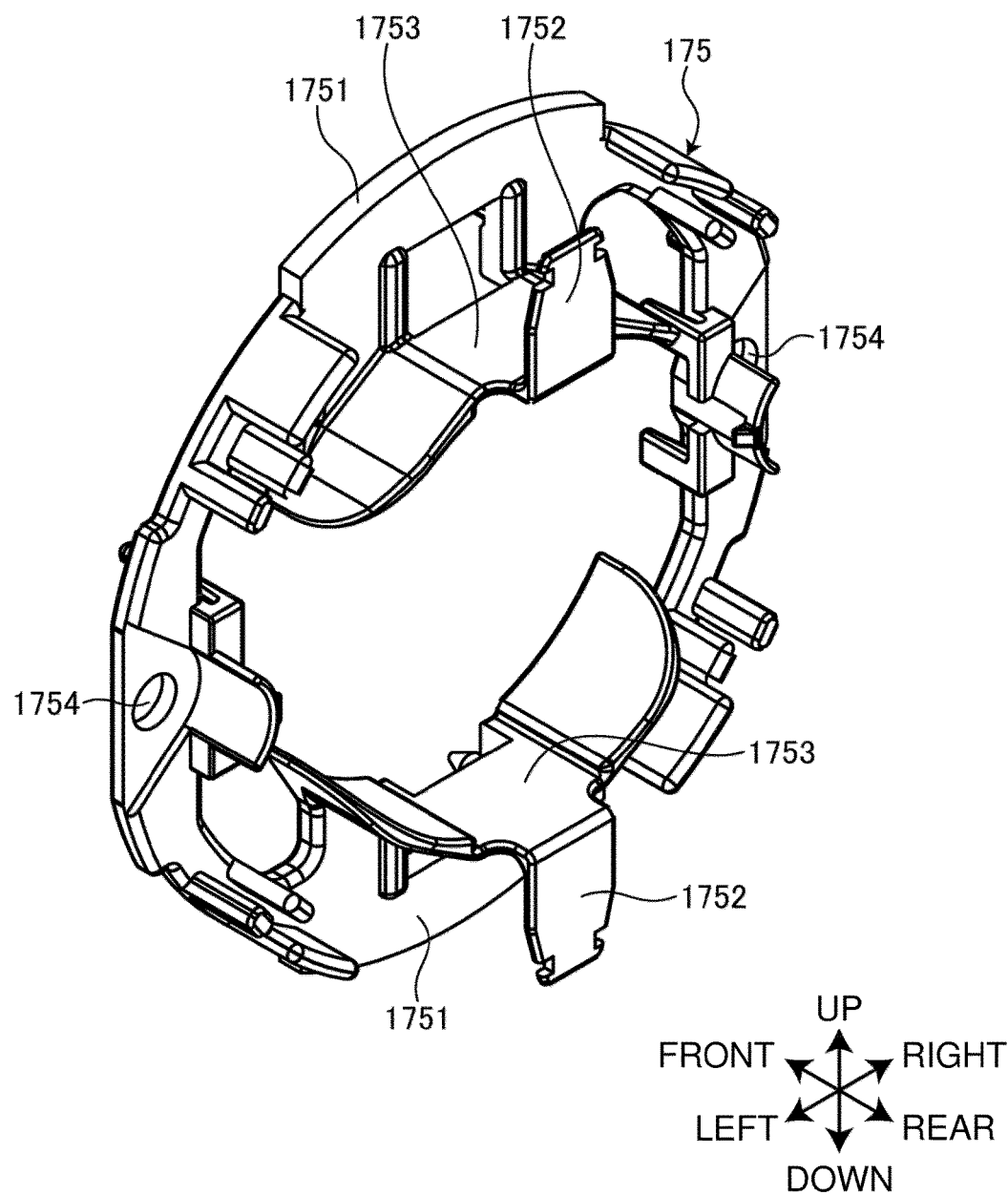
FIG. 20 is a perspective view of an insulator in the fifth embodiment.

FIG. 19 is a partial perspective sectional view of the grinder 1E according to the present embodiment. FIG. 20 is a perspective view of an insulator 175.

The insulator 175 in the present embodiment includes an insulator unit 1751, rear portions 1752, and inner portions 1753. The insulator unit 1751 is fixed to the rear end of the stator core 171. The rear portions 1752 are located behind the coils 173. The inner portions 1753 are located radially inward from the coils 173.

The stator core 171 and the insulator 175 are fastened together with the screws 60. The insulator unit 1751 has openings 1754 receiving the screws 60.

In the present embodiment, the insulator unit 1751 has a radially outward end protruding outward from the outer circumferential surface of the stator core 171. The insulator unit 1751 is at least partially located between the outer circumferential surface of the stator core 171 and the inner circumferential surface of the cylinder 41. The insulator unit 1751 has an upper portion located between an upper portion of the outer circumferential surface of the stator core 171 and the inner circumferential surface of the cylinder 41. The insulator unit 1751 has a lower portion located between a lower portion of the outer circumferential surface of the stator core 171 and the inner circumferential surface of the cylinder 41.

The insulator unit 1751 prevents air flowing into the motor housing 4 through the vents 43 from passing between the outer circumferential surface of the stator core 171 and the inner circumferential surface of the cylinder 41. This improves the airflow and reduces accumulation of dust near the commutator 25 and the carbon brushes 26.

As described above, in place of the inner baffles 32 described in the third embodiment, parts of the insulator 175 may be located between the outer circumferential surface of the stator core 171 and the inner circumferential surface of the cylinder 41. The structure according to the present embodiment also reduces dust entering between the commutator 25 and the carbon brushes 26. As the fan 23 rotates, dust around the housing 2 may enter the motor housing 4 through the inlets 78 and the vents 43. The insulator unit 1751 improves airflow and reduces accumulation of dust near the commutator 25 and the carbon brushes 26. This reduces dust entering between the commutator 25 and the carbon brushes 26. The commutator 25 and the carbon brushes 26 are thus less likely to have a shorter service life.

Sixth Embodiment

A sixth embodiment will now be described. Like reference numerals hereafter denote like or corresponding components in the above embodiments. Such components will be described briefly or will not be described.

Figure 21:
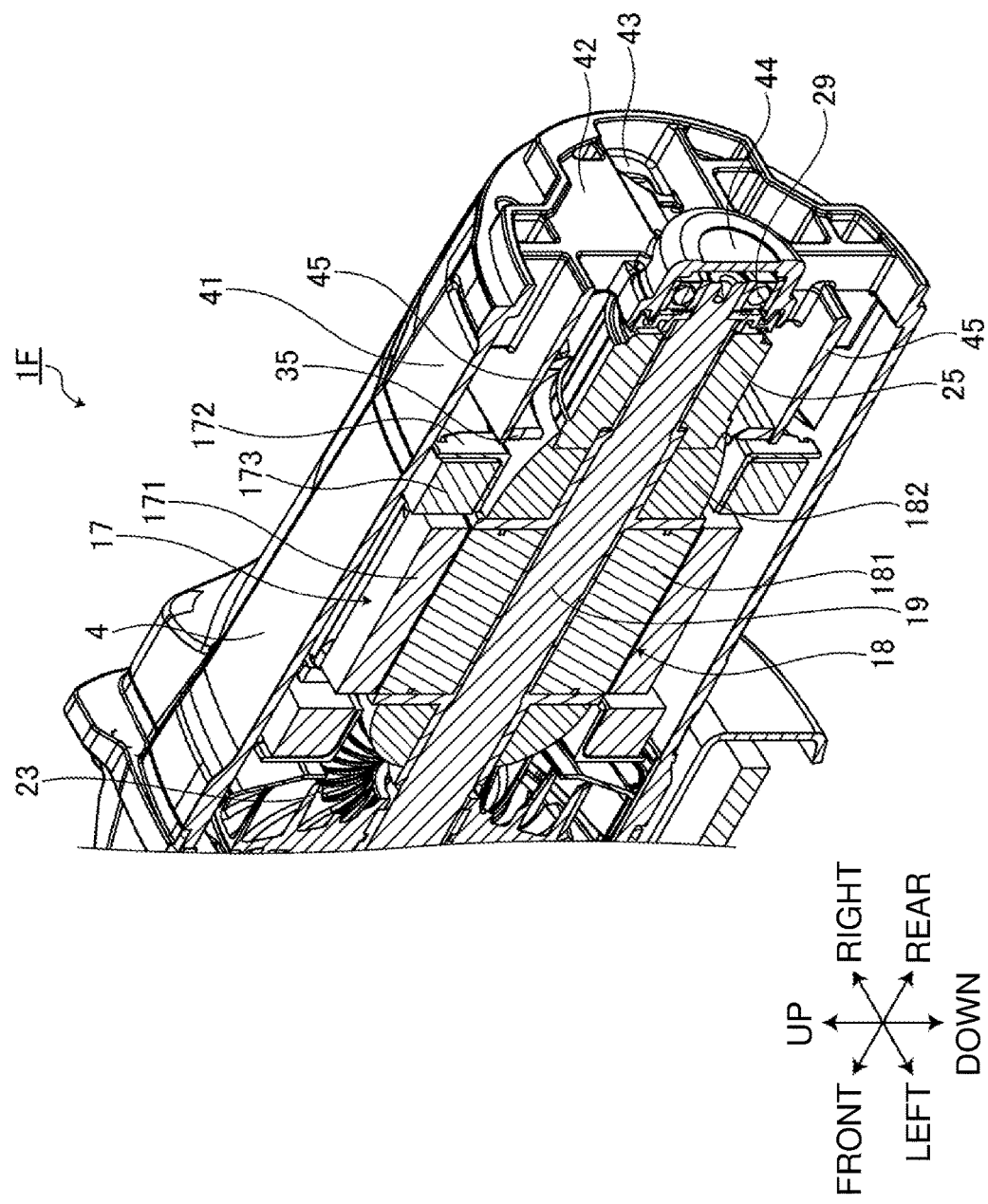
FIG. 21 is a partial perspective sectional view of a grinder according to a sixth embodiment.
Figure 22:
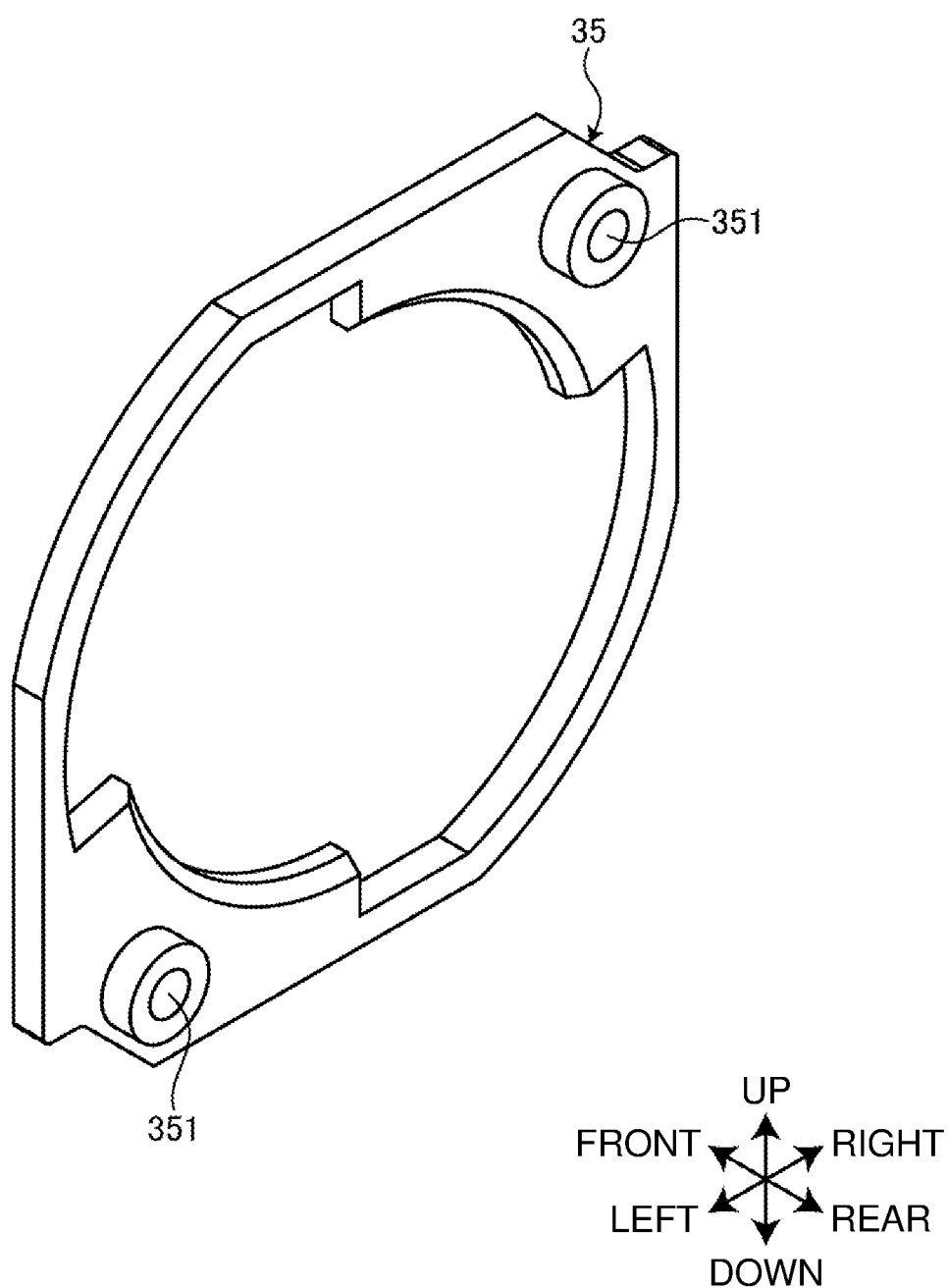
FIG. 22 is a perspective view of an inner baffle in the sixth embodiment.
Figure 23:
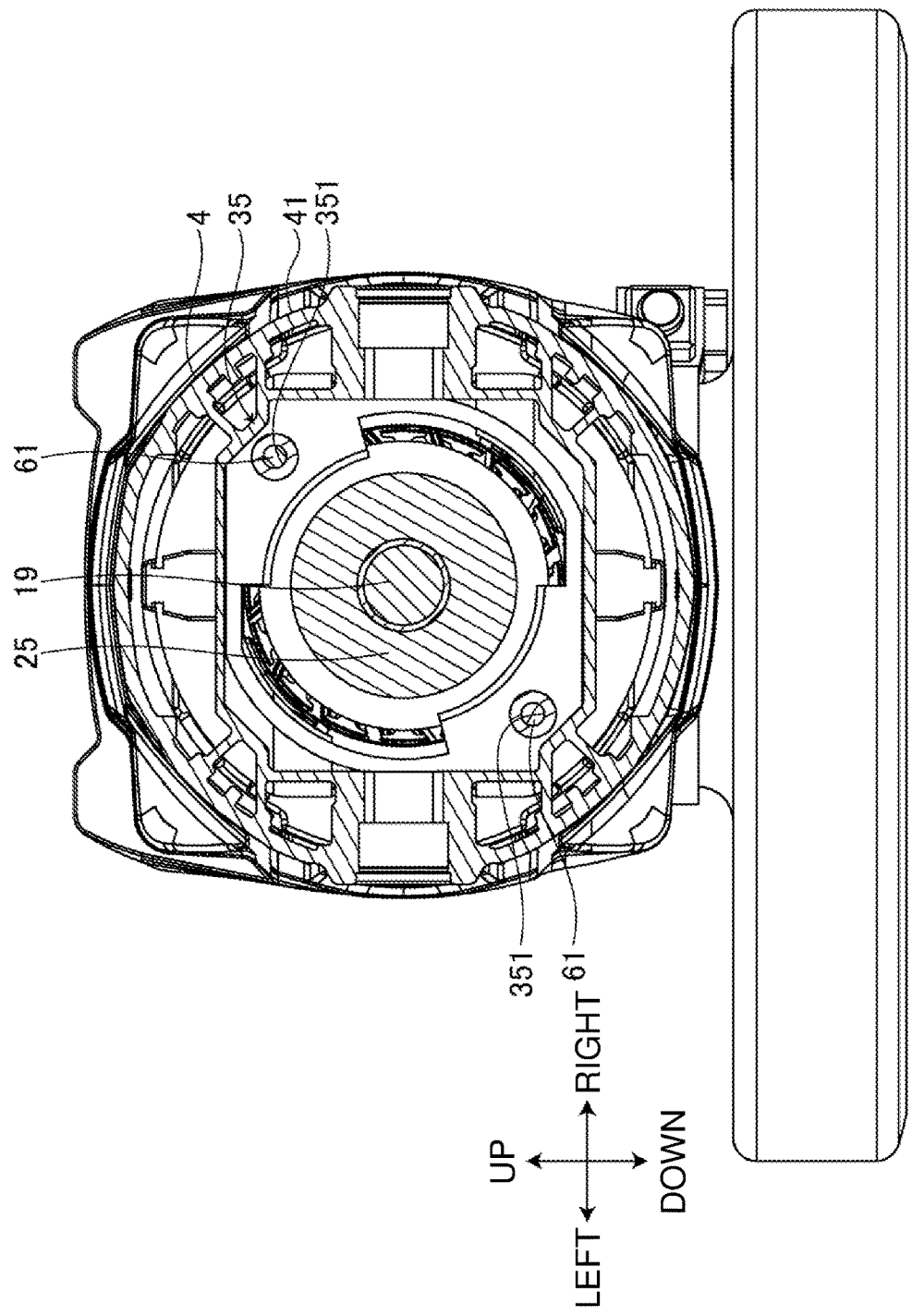
FIG. 23 is a partial sectional view of the grinder according to the sixth embodiment.

FIG. 21 is a partial perspective sectional view of a grinder 1F according to the present embodiment. FIG. 22 is a perspective view of an inner baffle 35. FIG. 23 is a partial sectional view of the grinder 1F.

The grinder 1F according to the present embodiment includes the inner baffle 35. The inner baffle 35 is located between an insulator 172 located rearward from the stator core 171 in the front-rear direction and the brush holders 27. The inner baffle 35 is ring-shaped. The inner baffle 35 is separate from the motor housing 4.

As shown in FIG. 12, a position at which the second reference circle B intersects with the reference line RL passing through the motor rotation axis AX and the centers of the carbon brushes 26 in a predetermined plane is a 0° position. The insulator 172 satisfies the following condition.

$$S1 > S2 \quad (2)$$

In the formula, S1 is the area (surface area) of the inner baffle 35 in the first section C1 of the annular range C from the 0° position to a 90° position in the counter-rotation direction of the rotor 18, and S2 is the area (surface area) of the inner baffle 35 in the second section C2 of the annular range C from the 0° position to a 90° position in the forward-rotation direction of the rotor 18.

The inner baffle 35 has its inner end located inward from the inner end of the insulator 172 in the radial direction of the motor rotation axis AX.

The inner baffle 35 has openings 351 receiving screws 61. The stator core 171, the insulator 172, and the inner baffle 35 are fastened together with the screws 61.

As described above, the structure according to the present embodiment also reduces dust entering between the commutator 25 and the carbon brushes 26. As the fan 23 rotates, dust around the housing 2 may enter the motor housing 4 through the inlets 78 and the vents 43. The inner baffle 35 improves airflow and reduces accumulation of dust near the commutator 25 and the carbon brushes 26. This reduces dust entering between the commutator 25 and the carbon brushes 26. The commutator 25 and the carbon brushes 26 are thus less likely to have a shorter service life.

The inner baffle 35 may be integral with, for example, the motor housing 4.

Seventh Embodiment

A seventh embodiment will now be described. Like reference numerals hereafter denote like or corresponding components in the above embodiments. Such components will be described briefly or will not be described.

In the above embodiments, the power tool is the grinder. The power tool may be a cutter.

Figure 24:
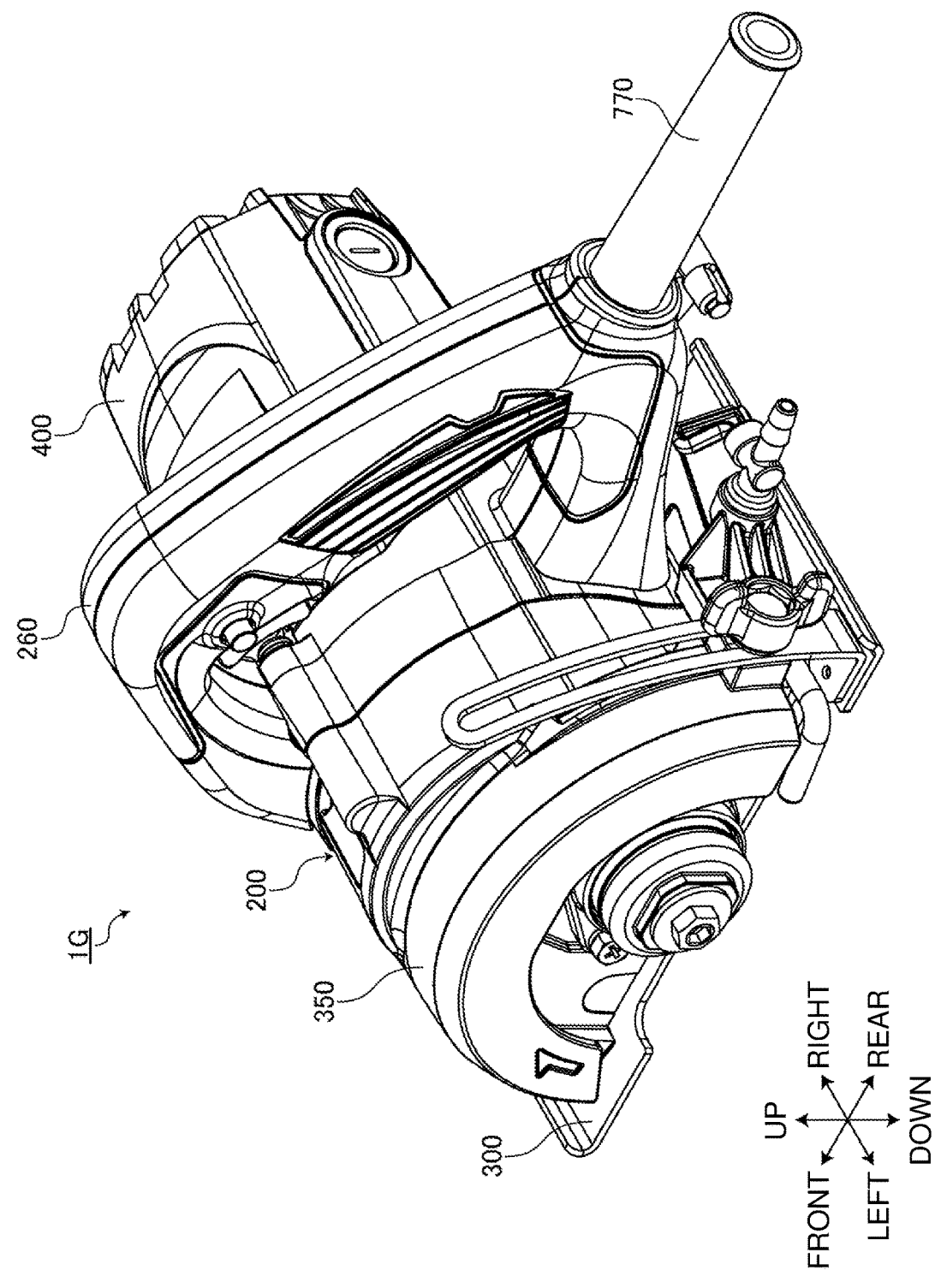
FIG. 24 is a perspective view of a cutter according to a seventh embodiment.
Figure 25:
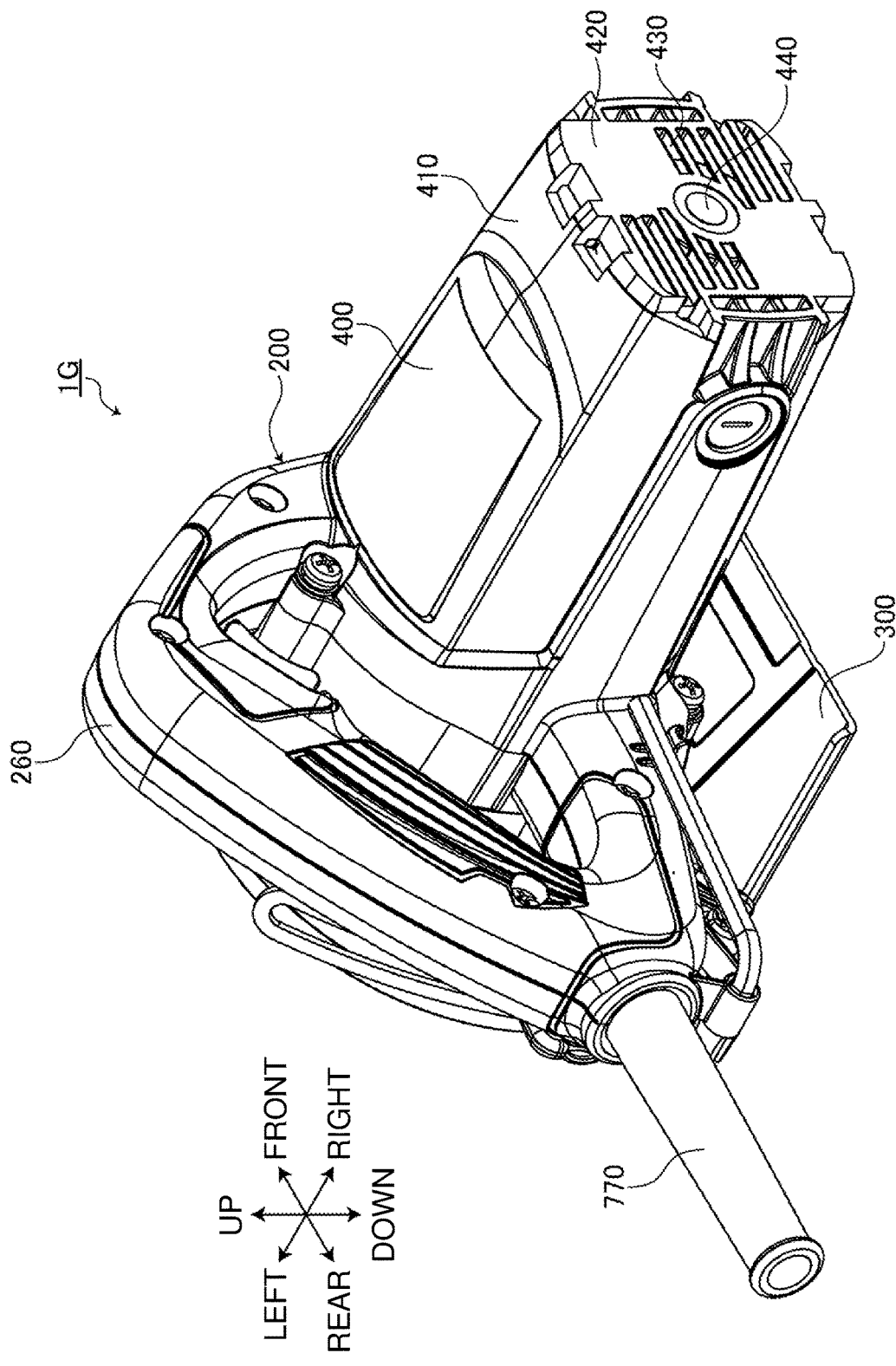
FIG. 25 is a perspective view of the cutter according to the seventh embodiment.
Figure 26:
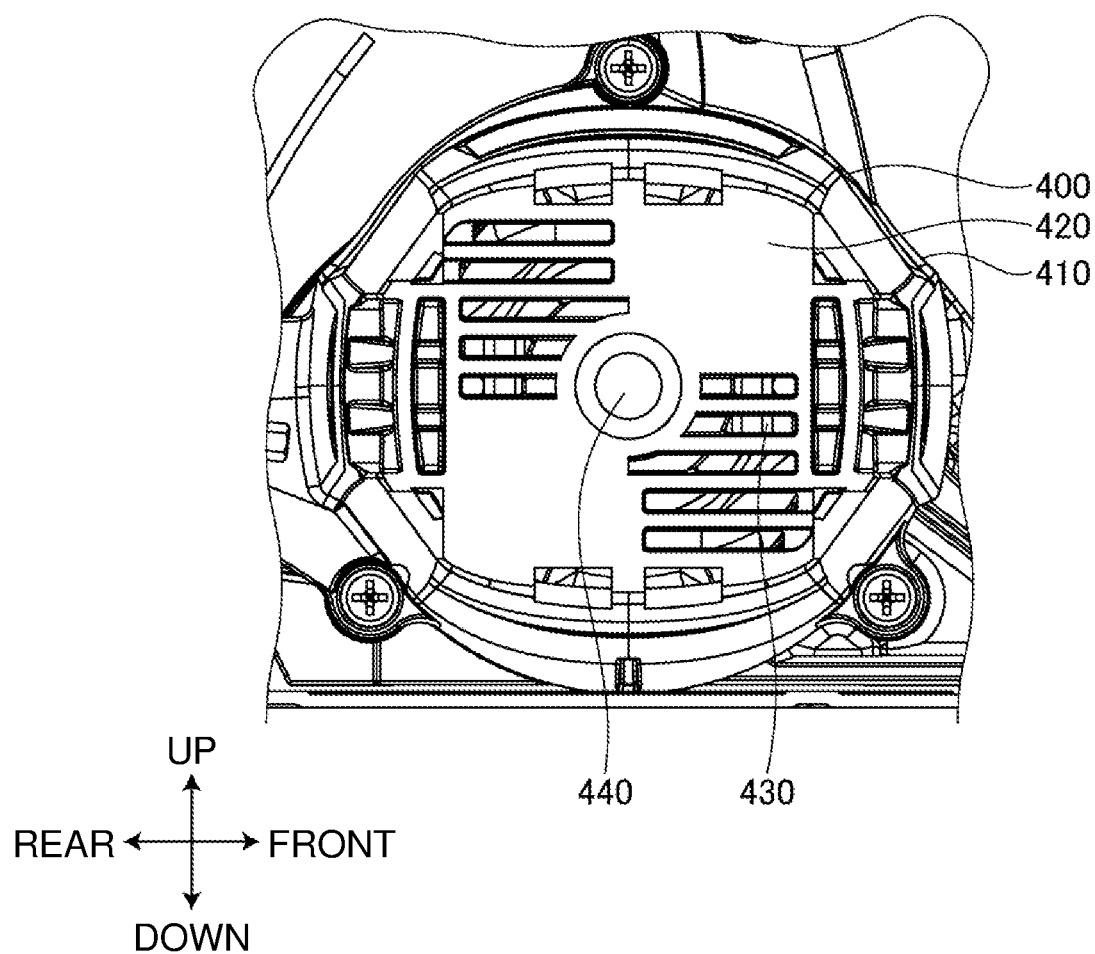
FIG. 26 is a perspective view of a motor housing in the seventh embodiment.
Figure 27:
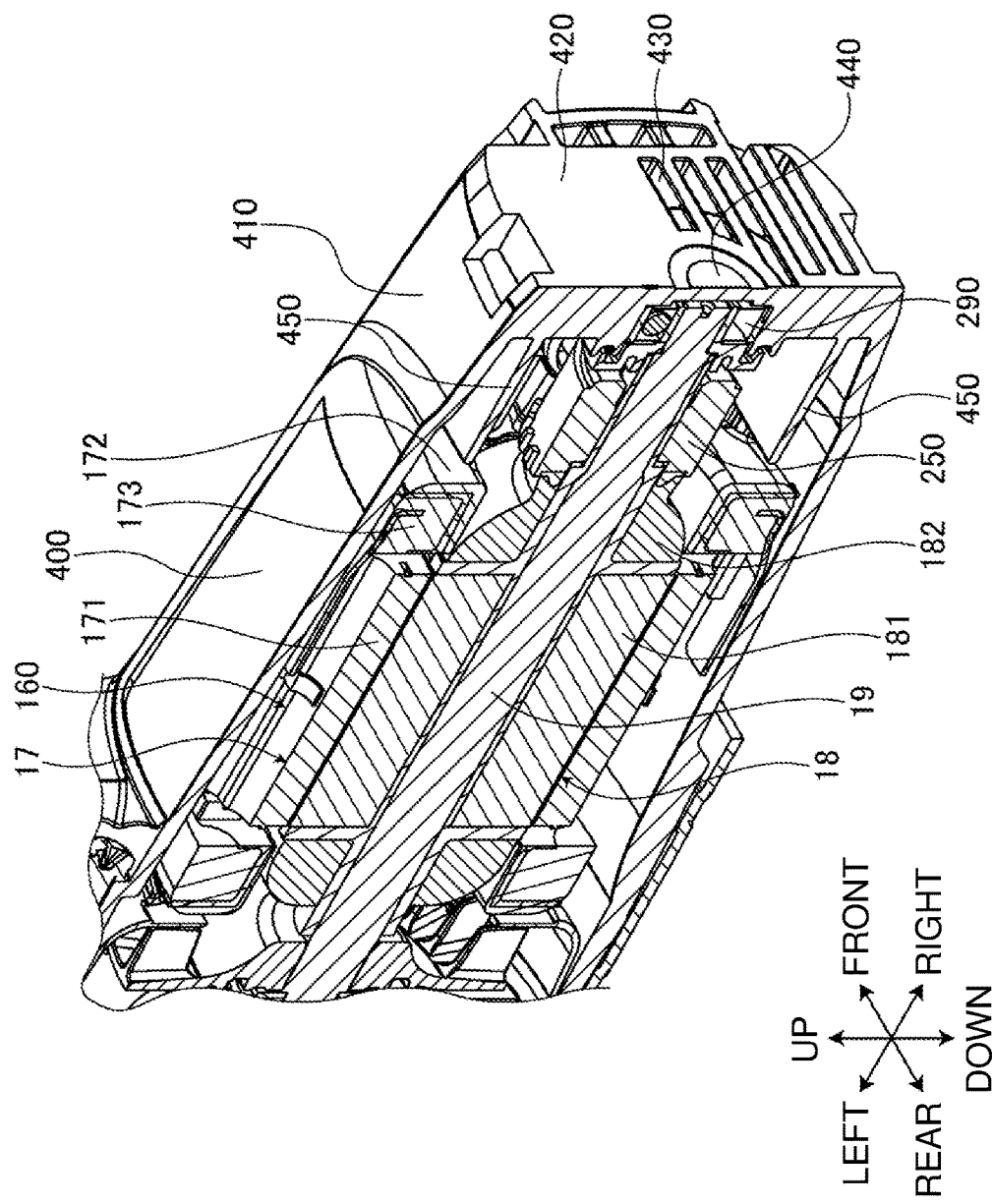
FIG. 27 is a partial perspective sectional view of the cutter according to the seventh embodiment.

FIG. 24 is a perspective view of a cutter 1G according to the present embodiment. FIG. 25 is a perspective view of the cutter 1G. FIG. 26 is a perspective view of a motor housing 400. FIG. 27 is a partial perspective sectional view of the cutter 1G.

The cutter 1G includes the motor housing 400, a main housing 200, a base plate 300, a cover 350, a grip housing 260, and a power cable 770. The motor housing 400 contains the motor 16. The main housing 200 supports a blade. The cover 350 partially surrounds the blade. Similarly to the motor housing 4 described in the above embodiments, the motor housing 400 includes a cylinder 410, a bottom 420, vents 430, and a bearing retainer 440.

As shown in FIG. 27, the motor 16 includes the rotor shaft 19 and a commutator 250. The commutator 250 is fixed to the rotor shaft 19. The rotor shaft 19 has a rear end supported by a bearing 290. The bearing 290 is supported by the bearing retainer 440.

Ribs 450 protrude leftward from a left surface of the bottom 420. The ribs 450 have their left ends located leftward from the carbon brushes 26.

The cutter 1G is used to cut a workpiece. The workpiece being cut generates dust. The cutter 1G may include the components described in each embodiment described above to reduce deterioration of the commutator 250 and the carbon brushes 26.

REFERENCE SIGNS LIST 1A grinder (power tool)
1B grinder (power tool)
1C grinder (power tool)
1D grinder (power tool)
1E grinder (power tool)
1F grinder (power tool)
1G cutter (power tool)
2 housing
3 gear housing
4 motor housing
5 handle housing
6 spindle
7 bearing
8 retainer 9 bearing
10 first bevel gear
11 inner flange
12 outer flange
13 grinding disc
14 wheel cover
15 outlet
16 motor
17 stator
18 rotor
181 rotor core
182 coil
19 rotor shaft
20 partition
21 bearing
22 bevel gear
23 fan
25 commutator
26 carbon brush
27 brush holder
29 bearing
30 rib member
31 rib
32 inner baffle
32A inner baffle
32B inner baffle
33 recess
35 inner baffle
41 cylinder
42 bottom
43 vent
44 bearing retainer
45 rib
49 threaded hole
50 opening
60 screw
61 screw
67 screw
72 switch
73 plunger
74 switch lever
75 coil spring
76 lock lever
77 power cable
78 inlet
171 stator core
172 insulator
173 coil
174 insulator
175 insulator
200 main housing
250 commutator
260 grip housing
290 bearing
300 base plate
321 body
322 protrusion
323 positioner
350 cover
351 opening
400 motor housing
410 cylinder
420 bottom
430 vent
440 bearing retainer
450 rib
770 power cable
1741 insulator unit
1742 rib
1745 opening
1751 insulator unit
1752 rear portion
1753 inner portion
1754 opening
A first reference circle
AX motor rotation axis
B second reference circle
BX output rotation axis
C annular range
C1 first section
C2 second section
RL reference line

What is claimed is:

1. A power tool, comprising:
a motor including
 a rotor including a rotor shaft, the rotor being rotatable in one direction about a motor rotation axis extending along a predetermined axis,
 a fan fixed to a first portion of the rotor shaft in a first direction from a middle of the rotor shaft along the predetermined axis,
 a commutator fixed to a second portion of the rotor shaft in a second direction from the middle of the rotor shaft along the predetermined axis,
 a stator surrounding the rotor, and
 a carbon brush in contact with the commutator; and
a housing supporting the stator, the housing including
 a cylinder surrounding the motor,
 a bottom located in the second direction from the commutator and connected to the cylinder,
 a vent in the bottom, and
 a rib protruding from the bottom in the first direction, the rib having an end in the first direction located in the first direction from the carbon brush,
wherein a predetermined plane perpendicular to the motor rotation axis includes
 a first reference circle having a diameter being one times an outer diameter of the commutator and centered on the motor rotation axis,
 a second reference circle having a diameter being 1.5 times the outer diameter of the commutator and centered on the motor rotation axis, and
 an annular range between the first reference circle and the second reference circle, and
P1<P2, where, when a position at which the second reference circle intersects with a reference line passing through the motor rotation axis and a center of and the carbon brush in the predetermined plane is a 0° position, P1 is an opening ratio of the vent in a first section of the annular range from the 0° position to a 90° position in a counter-rotation direction of the rotor, and P2 is an opening ratio of the vent in a second section of the annular range from the 0° position to a 90° position in a forward-rotation direction of the rotor.

2. The power tool according to claim 1, wherein the rib at least partially surrounds the commutator.

3. The power tool according to claim 1, wherein the rib has an end in the second direction connected to a surface of the bottom in the first direction.

4. The power tool according to claim 3, wherein the rib is integral with the bottom.

5. The power tool according to claim 3, wherein the rib is separate from the bottom.

6. The power tool according to claim 1, wherein
the stator includes
a stator core,
an insulator fixed to the stator core, and
a coil supported by the insulator, and
the rib has the end in the first direction facing the insulator.

7. The power tool according to claim 6, wherein
the rib has the end in the first direction at least partially surrounding the coil.

8. The power tool according to claim 1, further comprising:
a bearing supporting an end of the rotor shaft in the second direction,
wherein the bottom include a bearing retainer retaining the bearing.

9. The power tool according to claim 1, further comprising:
a brush holder holding the carbon brush,
wherein the rib has a recess receiving the brush holder.

10. A power tool, comprising:
a motor including
a rotor including a rotor shaft, the rotor being rotatable about a motor rotation axis extending along a predetermined axis,
a fan fixed to a first portion of the rotor shaft in a first direction from a middle of the rotor shaft along the predetermined axis,
a commutator fixed to a second portion of the rotor shaft in a second direction from the middle of the rotor shaft along the predetermined axis,
a carbon brush in contact with the commutator, and
a stator surrounding the rotor, the stator including
a stator core,
an insulator fixed to the stator core,
a rib protruding from the insulator in the second direction, the rib having an end in the second direction located in the second direction from an end of the carbon brush in the first direction, and
a coil supported by the insulator; and
a housing supporting the stator, the housing including
a cylinder surrounding the motor,
a bottom located in the second direction from the commutator and connected to the cylinder, and
a vent in the bottom;

11. The power tool according to claim 10, wherein
the rib has the end in the second direction at least partially surrounding the commutator.

12. The power tool according to claim 10, wherein
the rib has an end in the first direction connected to the insulator.

13. The power tool according to claim 12, wherein
the rib is integral with the insulator.

14. The power tool according to claim 10, wherein
the rib has the end in the second direction facing a surface of the bottom in the first direction.

15. The power tool according to claim 10, further comprising:
a bearing supporting an end of the rotor shaft in the second direction,
wherein the bottom includes a bearing retainer retaining the bearing.

16. The power tool according to claim 10, further comprising:
a screw fastening the stator core and the insulator.

17. A power tool, comprising:
a motor including
a rotor including a rotor shaft, the rotor being rotatable about a motor rotation axis extending along a predetermined axis,
a fan fixed to a first portion of the rotor shaft in a first direction from a middle of the rotor shaft along the predetermined axis,
a commutator fixed to a second portion of the rotor shaft in a second direction from the middle of the rotor shaft along the predetermined axis,
a stator surrounding the rotor, the stator including
a stator core,
an insulator fixed to the stator core, and
a coil supported by the insulator, and
a carbon brush in contact with the commutator;
a housing supporting the stator, the housing including
a cylinder surrounding the motor,
a bottom located in the second direction from the commutator and connected to the cylinder, and
a vent in the bottom;
a brush holder supported by the cylinder and holding the carbon brush; and
an inner baffle between the insulator and the brush holder along the predetermined axis, the inner baffle having an inner end located inward from an inner end of the insulator in a radial direction of the motor rotating axis,
wherein a predetermined plane perpendicular to the motor rotation axis includes
a first reference circle having a diameter being one times an outer diameter of the commutator and centered on the motor rotation axis,
a second reference circle having a diameter being 1.5 times the outer diameter of the commutator and centered on the motor rotation axis, and
an annular range between the first reference circle and the second reference circle, and
S1>S2, where, when a position at which the second reference circle intersects with a reference line passing through the motor rotation axis and a center of the carbon brush in the predetermined plane is a 0° position, S1 is an area of the inner baffle in a first section of the annular range from the 0° position to a 90° position in a counter-rotation direction of the rotor, and S2 is an area of the inner baffle in a second section of the annular range from the 0° position to a 90° position in a forward-rotation direction of the rotor.

18. The power tool according to claim 17, wherein
the inner baffle is separate from the housing.

19. The power tool according to claim 17, further comprising:
a screw fastening the stator core and the insulator,
wherein the inner baffle is fastened to the insulator with the screw.

20. The power tool according to claim 17, wherein
the inner baffle is integral with the housing.

* * * * *